(12) United States Patent
Yachida et al.

(10) Patent No.: US 12,549,005 B2
(45) Date of Patent: Feb. 10, 2026

(54) FLICKER PREVENTION DEVICE AND FLICKER PREVENTION CONTROL METHOD

(71) Applicants: TOSHIBA MITSUBISHI-ELECTRIC INDUSTRIAL SYSTEMS CORPORATION, Chuo-ku (JP); Mitsubishi Electric Corporation, Chiyoda-ku (JP)

(72) Inventors: Takayuki Yachida, Chuo-ku (JP); Naoki Morishima, Chuo-ku (JP); Kenichi Kondoh, Chuo-ku (JP); Akihiro Teguri, Chuo-ku (JP); Tatsuya Takahashi, Chiyoda-ku (JP); Naoki Tani, Chiyoda-ku (JP)

(73) Assignees: TMEIC Corporation, Chuo-ku (JP); Mitsubishi Electric Corporation, Chiyoda-ku (JP)

( * ) Notice: Subject to any disclaimer, the term of this patent is extended or adjusted under 35 U.S.C. 154(b) by 201 days.

(21) Appl. No.: 18/006,833

(22) PCT Filed: Jan. 26, 2022

(86) PCT No.: PCT/JP2022/002885
§ 371 (c)(1),
(2) Date: Jan. 25, 2023

(87) PCT Pub. No.: WO2022/163697
PCT Pub. Date: Aug. 4, 2022

(65) Prior Publication Data
US 2023/0275429 A1    Aug. 31, 2023

(30) Foreign Application Priority Data

Jan. 29, 2021    (WO) .................. PCT/JP2021/003265

(51) Int. Cl.
*H02J 3/00*    (2006.01)
*H02J 3/16*    (2006.01)

(52) U.S. Cl.
CPC ................. *H02J 3/002* (2020.01); *H02J 3/16* (2013.01)

(58) Field of Classification Search
CPC .................................. H02J 3/002; H02J 3/16
(Continued)

(56) References Cited

FOREIGN PATENT DOCUMENTS

CN    108092287 A    5/2018
JP    2016-92851 A    5/2016
(Continued)

OTHER PUBLICATIONS

International Search Report issued Apr. 5, 2022 in PCT/JP2022/002885, 2 pages.
(Continued)

*Primary Examiner* — Daniel Kessie
*Assistant Examiner* — Dru M Parries
(74) *Attorney, Agent, or Firm* — Oblon, McClelland, Maier & Neustadt, L.L.P.

(57) ABSTRACT

A frequency detector detects a system frequency from an AC voltage on an AC power line to which a power conditioner performing system interconnection of a distributed power supply is connected. A power converter is configured to inject lead reactive power or delay reactive power into the AC power line. A controller controls reactive power output from the power converter to output the lead reactive power in response to an increase in the system frequency while outputting the delay reactive power in response to a decrease in the system frequency.

12 Claims, 20 Drawing Sheets

(58) Field of Classification Search
USPC .......................................................... 307/69
See application file for complete search history.

(56) References Cited

FOREIGN PATENT DOCUMENTS

| JP | 2016092851 A | * | 5/2016 |
|----|--------------|---|--------|
| JP | 2017-147875 A | | 8/2017 |
| JP | 2017147785 A | * | 8/2017 |
| JP | 2019-068527 A | | 4/2019 |
| JP | 2020-18081 A | | 1/2020 |
| JP | 2020014358 A | * | 1/2020 |

OTHER PUBLICATIONS

Written Opinion issued Apr. 5, 2022 in PCT/JP2022/002885 (with English translation), 11 pages.

Chikamatsu et al., "Study on flicker suppression method utilizing STATCOM.", IEE Japan, 2019, p. 379 (with Partial English translation).

Higashitani et al., "A Study on Influence of Reactive-Power Control Gain of STATCOM on Voltage Flicker Caused by Power Conditioning System in Power Distribution System", IEE Japan, 2019, p. 380 (with Partial English Translation).

Japanese Office Action issued Jul. 25, 2023 in Japanese Application 2022-549497, (with unedited computer-generated English translation), 7 pages.

Extended European Search Report dated Apr. 10, 2025, issued in the corresponding European Patent Application No. 22745916.1. (14 pages) (Citied references previously filled in IDS.).

Office Action dated Dec. 17, 2025, issued in counterpart IN Application No. 202317005455, with English Translation. (7 pages).

* cited by examiner

FLICKER PREVENTION DEVICE AND FLICKER PREVENTION CONTROL METHOD

TECHNICAL FIELD

The present invention relates to a flicker prevention device and a flicker prevention control method.

BACKGROUND ART

In recent years, with the progress of introduction of regeneration energy, a large number of distributed power supplies typified by a solar power generation device are connected to a power system. In addition, the application of a new active method (frequency feedback method with step injection) defined in a JEM1498 regulation has been increased as a detection function of an isolated operation state to a power conditioner (PCS: Power Conditioning System) performing system interconnection of a distributed power supply. In the new active method, whether the power system is in the isolated operation state is determined by monitoring a change in the system frequency when reactive power is injected from the PCS into the power system.

It is known that, a phenomenon in which a voltage fluctuation (flicker) of the power system is generated at a frequency of about 6 to 7 Hz is generated due to a large number of PCSs to which such the new active method is applied being connected to the power system (see NPL 1). NPLs 1 and 2 describe an attempt to prevent the flicker due to the above factor using a reactive power compensation device represented by a static synchronous compensator (STATCOM).

CITATION LIST

Non Patent Literature

NPL 1: "Study on Flicker Suppression Technique Utilizing STATCOM", written by Naonori Chikamatsu et al., The Institute of Electrical Engineers of Japan, Mar. 1, 2019, 2019 National Convention of The Institute of Electrical Engineers of Japan, p. 6-222, 379

NPL 2: "Occurrence of flicker due to PCS in distribution system and influence of reactive power injection gain of STATCOM", Takuma Higashitani et al., The Institute of Electrical Engineers of Japan, Mar. 1, 2019, 2019 National Convention of The Institute of Electrical Engineers of Japan, p. 6-223, 380

SUMMARY OF INVENTION

Technical Problem

Normally, in voltage compensation control by the reactive power compensation device, flicker is prevented by supplying the delay reactive power (reactive current) during an increase in the system voltage and supplying the lead reactive power (reactive current) during a decrease in the system voltage in consideration that a transmission line constituting the power system is an inductive load.

However, according to NPL 1, it is described that a voltage fluctuation component of about 6 to 7 Hz is prevented by the voltage compensation control using the STATCOM while the voltage fluctuation around 20 Hz is increased.

In addition, according to NPL 2, it is described that an influence of a reactive power control gain of the STATCOM on the flicker is large and the case where the flicker increases more than at the time of no control when a gain value is inappropriate.

The present invention has been made to solve such the problem, and an object of the present invention is to prevent the flicker of the power system to which the power conditioner performing the system interconnection of the distributed power supply is connected.

Solution to Problem

According to one aspect of the present invention, a flicker prevention device for a power system to which a power conditioner performing system interconnection of a distributed power supply is connected includes a power converter, a frequency detector, and a controller. The power converter is configured to inject delay reactive power or lead reactive power into a power system. The frequency detector is configured to detect a system frequency that is a frequency of an AC voltage on the power system. The controller controls output of the power converter based on the detected system frequency. The controller is configured to control the power converter so as to output the lead reactive power in response to an increase in the system frequency while outputting the delay reactive power in response to a decrease in the system frequency.

According to another aspect of the present invention, a flicker prevention control method for a power system to which a power conditioner performing system interconnection of a distributed power supply is connected, the method includes: detecting a system frequency that is a frequency of an AC voltage on the power system; and controlling a power converter injecting delay reactive power or lead reactive power into the power system based on the system frequency detected in the detecting. In the controlling, the power converter is controlled so as to output lead reactive power in response to an increase in the system frequency, and to output delay reactive power in response to a decrease in the system frequency.

According to still another aspect of the present invention, a flicker prevention device for a power system to which a power conditioner performing system interconnection of a distributed power supply is connected includes a power converter, a frequency detector, and a controller. The power converter is configured to inject delay reactive power or lead reactive power into a power system. The frequency detector is configured to detect a system frequency that is a frequency of an AC voltage on the power system. The frequency change amount calculator calculates a change amount of the system frequency. The controller controls output of the power converter based on the change amount of the system frequency. The controller selects one of the first control characteristic and the second control characteristic to control the reactive power output from the power converter so as to decrease the change amount of the system frequency detected by the power conditioner. When the first control characteristic is selected, the reactive power is controlled so as to output the lead reactive power in response to an increase in the system frequency, and to output the delay reactive power in response to a decrease in the system frequency. When the second control characteristic is selected, the reactive power is controlled so as to output the delay reactive power in response to the increase in the system frequency, and to output the lead reactive power in response to the decrease in the system frequency.

According to yet another aspect of the present invention, a flicker prevention control method for a power system to which a power conditioner performing system interconnection of a distributed power supply is connected, the method includes: detecting a system frequency that is a frequency of an AC voltage on the power system; calculating a change amount of the system frequency; and controlling a power converter injecting delay reactive power or lead reactive power into the power system based on the change amount of the system frequency. In the controlling, one of a first control characteristic for outputting the lead reactive power in response to an increase in the system frequency while outputting the delay reactive power in response to a decrease in the system frequency and a second control characteristic for outputting the delay reactive power in response to the increase in the system frequency while outputting the lead reactive power in response to the decrease in the system frequency, so as to decrease the change amount of the system frequency detected by the power conditioner is selected to control the reactive power output from the power converter.

Advantageous Effects of Invention

According to the present invention, the reactive power canceling the reactive power injected from the power conditioner performing the system interconnection of the distributed power supply is supplied from the power converter to the power system in response to the change (increase or decrease) in the system frequency, whereby the flicker (voltage fluctuation) caused by the reactive power injected from the power conditioner can be prevented.

DESCRIPTION OF EMBODIMENTS

Figure 1:
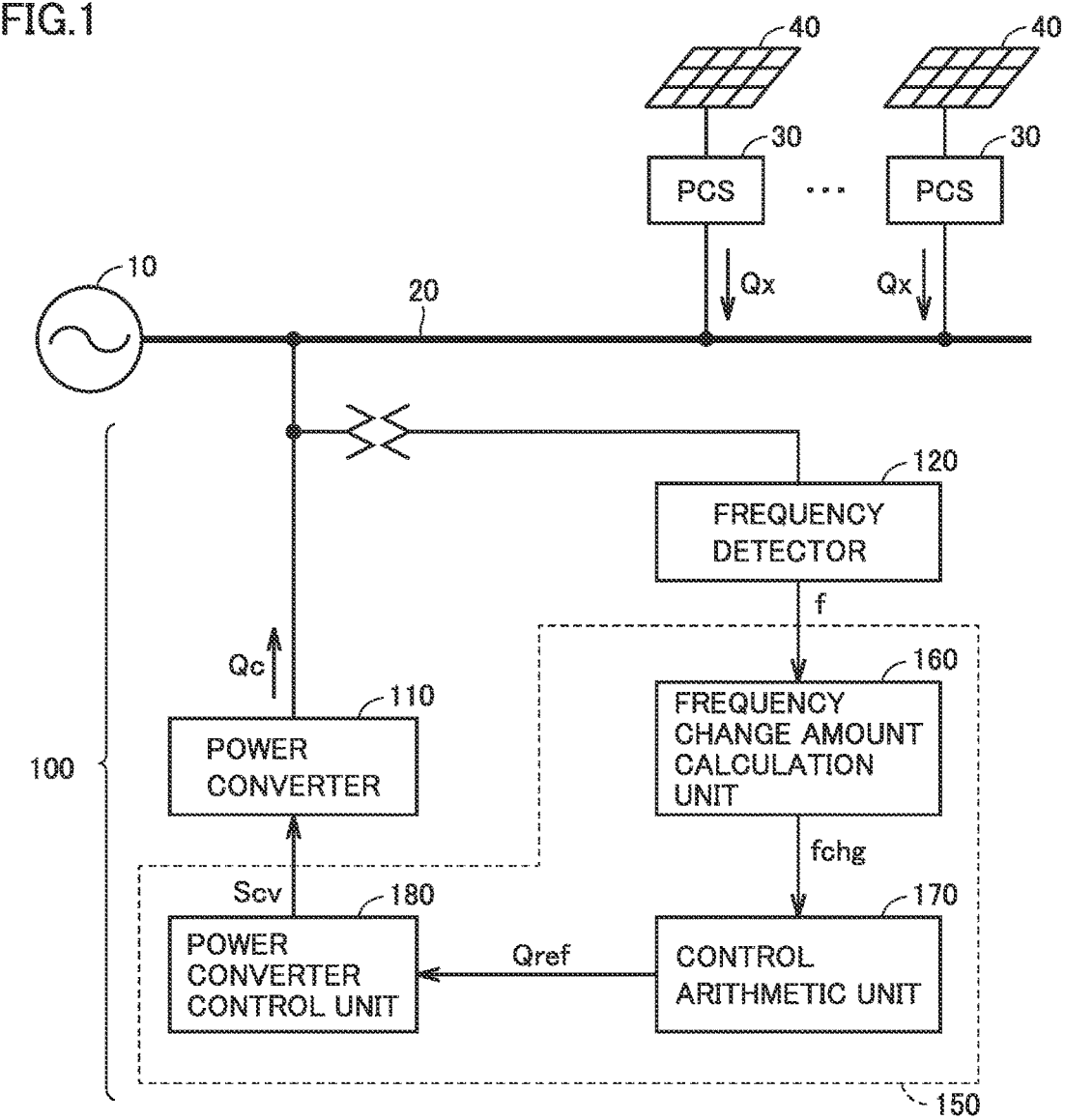
FIG. 1 is a schematic block diagram illustrating a configuration of a flicker prevention device according to a first embodiment.

Hereinafter, an embodiment of the present invention will be described in detail with reference to the drawings. In the drawings, the same or corresponding portion is denoted by the same reference numeral, and the description will not be repeated in principle.

First Embodiment

FIG. 1 is a schematic block diagram illustrating a configuration of a flicker prevention device according to a first embodiment.

As illustrated in FIG. 1, a flicker prevention device 100 of the first embodiment is connected to a power system including a voltage source 10 and an AC power line 20. A PCS 30 is connected to AC power line 20 performing system interconnection of a distributed power supply 40 represented by a solar power generation device. PCS 30 has the above-described function of detecting the islanded state, and outputs reactive power Qx for the detection function to AC power line 20.

Flicker prevention device 100 includes a power converter 110, a frequency detector 120, and a controller 150. Frequency detector 120 detects a system frequency f that is a frequency of the voltage from an AC voltage waveform on AC power line 20. Controller 150 controls reactive power Qc output from power converter 110 to AC power line 20 using system frequency f detected by frequency detector 120.

In the first embodiment, lead and delay of phases of reactive powers Qc, Qx (reactive currents) are in accordance with the JEM1498 regulation. Specifically, a direction in which power (current) flows from a system side (AC power line 20) into power converter 110 or PCS 30 is defined as "positive", the reactive power due to current in which the phase is delayed by 90 degrees with respect to the voltage in the current direction is defined as "delay (delay phase) reactive power", and conversely, the reactive power due to the current in which the phase is advanced by 90 degrees with respect to the voltage is defined as "lead (lead phase) reactive power".

Power converter 110 outputs reactive power Qc in the lead phase or the delay phase to AC power line 20. In the present specification, it is assumed that the lead reactive power is output in the case of Qc>0, and the delay reactive power is output from power converter 110 to AC power line 20 (power system) in the case of Qc<0. In addition, power converter 110 also has an operation state in which Qc=0, namely, the reactive power is not output.

Typically, power converter 110 can be configured by the STATCOM. However, as long as a controlled lead reactive power or delay reactive power can be selectively output, any device including a self commutated type reactive power regulator and a line communtated type reactive power regulator can be applied.

Controller 150 includes a frequency change amount calculation unit 160, a control arithmetic unit 170, and a power converter control unit 180. Frequency change amount calculation unit 160 calculates a frequency change amount fchg indicating a change (increase or decrease) in system frequency f using system frequency f detected by frequency detector 120. Control arithmetic unit 170 calculates a reactive power instruction value Qref according to a predetermined control operation with frequency change amount fchg as input. Power converter control unit 180 generates a control instruction Scv of power converter 110 in order to output reactive power Qc according to reactive power instruction value Qref. Control instruction Scv is input to power converter 110.

Figure 2:
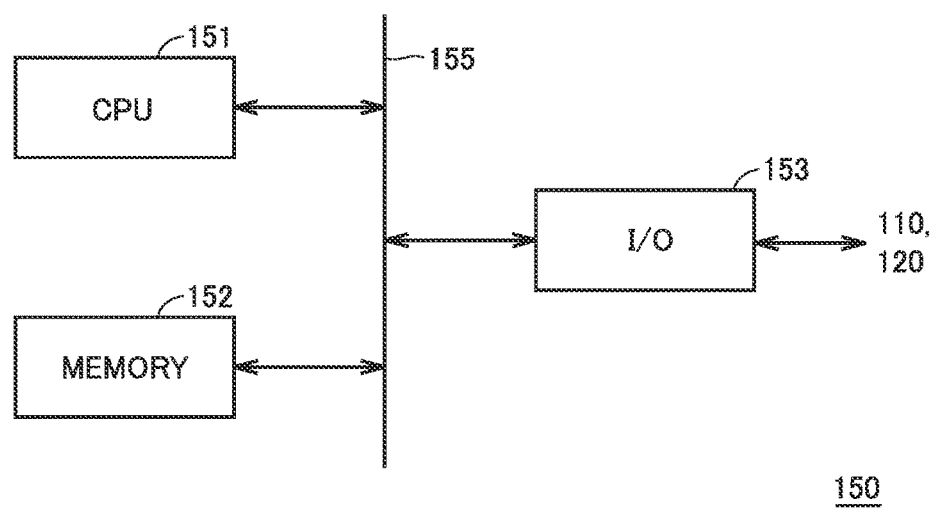
FIG. 2 is a block diagram illustrating a hardware configuration example of a controller in FIG. 1.

FIG. 2 illustrates a hardware configuration example of controller 150. Typically, controller 150 can be configured by a microcomputer in which a predetermined program is previously stored.

For example, as illustrated in FIG. 2, controller 150 includes a central processing unit (CPU) 151, a memory 152, and an input and output (I/O) circuit 153. CPU 151, memory 152, and I/O circuit 153 can exchange data with each other through a bus 155. A program is previously stored in a partial area of memory 152, and functions of frequency change amount calculation unit 160, control arithmetic unit 170, and power converter control unit 180 can be implemented by CPU 151 executing the program. I/O circuit 153 inputs and outputs a signal and data to and from the outside (for example, frequency detector 120 and power converter 110) of controller 150.

Alternatively, unlike the example in FIG. 2, at least a part of controller 150 can be configured using a circuit such as a field programmable gate array (FPGA) or an application specific integrated circuit (ASIC). Furthermore, at least a part of controller 150 can be configured by an analog circuit.

In this manner, the functions of the respective blocks of frequency change amount calculation unit 160, control arithmetic unit 170, and power converter control unit 180 in FIG. 1 can be implemented by at least one of software processing and hardware processing by controller 150.

Figure 3:
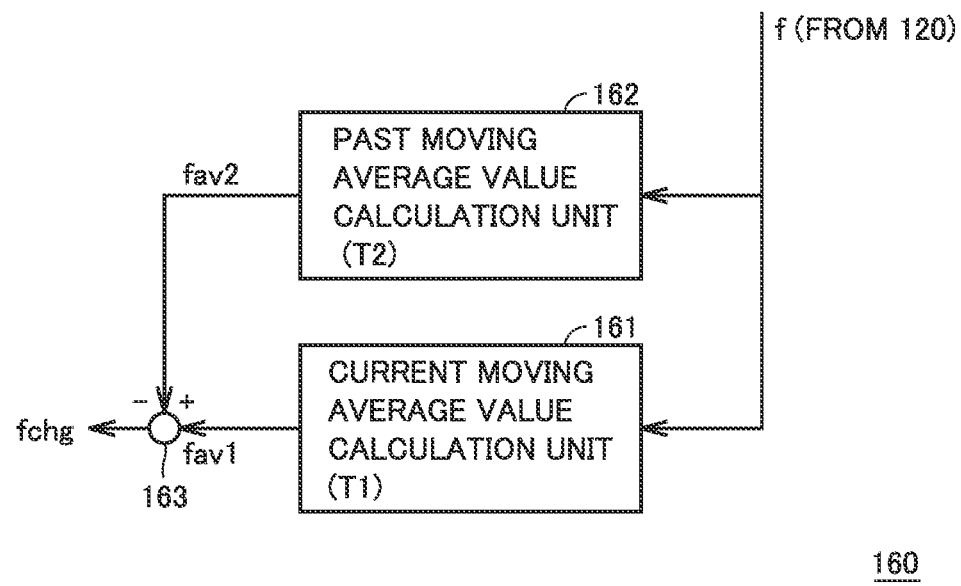
FIG. 3 is a block diagram illustrating a configuration example of a frequency change amount calculation unit in FIG. 1.

FIG. 3 illustrates a configuration example of frequency change amount calculation unit 160 in FIG. 1. System frequency f detected by frequency detector 120 is sequentially input to frequency change amount calculation unit 160.

Figure 4:
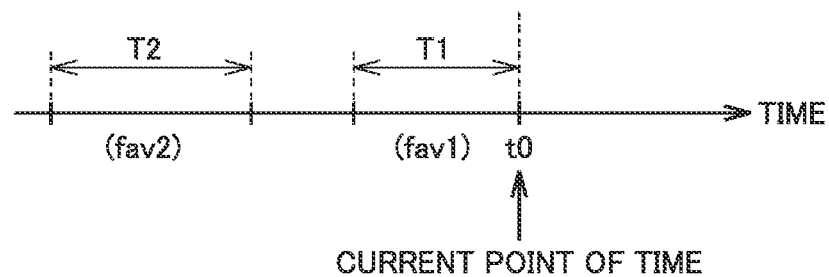
FIG. 4 is a conceptual diagram illustrating a calculation period of a moving average value in FIG. 3.

Frequency change amount calculation unit 160 includes a current moving average value calculation unit 161, a past moving average value calculation unit 162, and a subtraction unit 163. Current moving average value calculation unit 161 and past moving average value calculation unit 162 calculate moving average values in different periods T1 and T2 in FIG. 4 for sequentially input system frequency f.

Current moving average value calculation unit 161 calculates a moving average value fav1 in period T1 before a current point of time t0. For example, period T1 is set to the latest 40 [ms]. Past moving average value calculation unit 162 calculates a moving average value fav2 of system frequency fin period T2 before period T1. For example, period T2 is set to 320 [ms] going back from 200 [ms] before current point of time t0.

Subtraction unit 163 calculates frequency change amount fchg by subtracting moving average value fav2 by past moving average value calculation unit 162 from moving average value fav1 by the current moving average value calculation unit (fchg=fav1−fav2).

Alternatively, frequency change amount fchg can be calculated as a deviation of current system frequency f (for example, a setting value corresponding to 50 [Hz] or 60 [Hz] that is a nominal value) from reference value fr of the system frequency (fchg=f−fr).

As described above, in the first embodiment, frequency change amount fchg is calculated such that frequency change amount fchg has a positive polarity (fchg>0) when system frequency f increases, and such that fchg has a negative polarity (fchg<0) when system frequency f decreases. The method for calculating frequency change amount fchg is not limited to the above example. When the increase and decrease in the system frequency can be expressed, frequency change amount fchg can be calculated by an arbitrary method including the change of the definition of the polarity (positive or negative).

The calculation of the moving average value in periods T1, T2 exemplified in FIG. 3 conforms to the frequency change calculation method defined in the JEM1498 regulation, similarly to NPL 1. However, a difference in polarity of the frequency change amount between the first embodiment and NPL 1 will be described for check. That is, in NPL 1, the frequency deviation is set to a positive value when the system frequency decreases, and the frequency deviation is set to a negative value when the system frequency increases, but this polarity is opposite to the polarity (positive or negative) of frequency change amount fchg in the first embodiment described above.

As described above, PCS 30 performing the system interconnection of the distributed power supply outputs reactive power Qx to AC power line 20 in order to implement the function of detecting the isolated operation state. For example, reactive power Qx is output with the characteristic in FIG. 5 according to a new active method (frequency feedback method with step injection) defined in the JEM1498 regulation.

Figure 5:
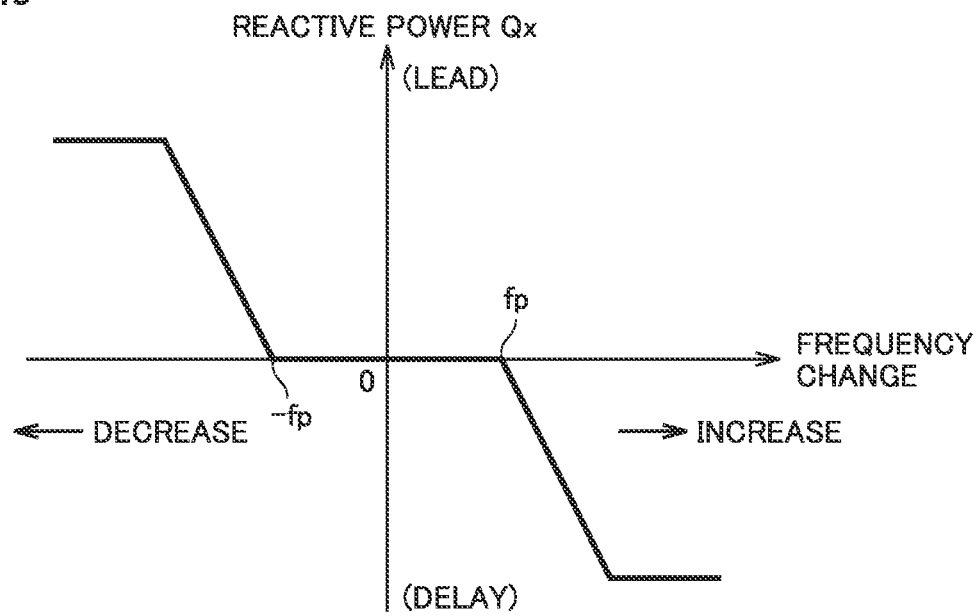
FIG. 5 is a conceptual diagram illustrating a characteristic of reactive power output from a PCS for system interconnection.

In a horizontal axis of FIG. 5, the change amount of the system frequency is indicated by the frequency rising direction as the positive direction according to the same polarity as that of the first embodiment, and in a vertical axis of FIG. 5, reactive power Qx is indicated by the same polarity as that of reactive power Qc described above, the lead reactive power is indicated by a positive value, and the delay reactive power is indicated by a negative value. The positive and negative of the reactive power in the vertical axis of FIG. 5 are opposite to the positive and negative of the reactive power in FIG. 3 (vertical axis) in NPL 1.

In the region where the absolute value of the change amount of the system frequency is small (less than or equal to reference value fp), PCS 30 sets Qx=0 and provides a dead zone in which the reactive power is not output to the power system. On the other hand, when the change amount of the system frequency changes to the frequency increase side beyond the dead zone, PCS 30 sets reactive power Qx so as to output the delay reactive power in order to further rise the system frequency (Qx<0). Similarly, when the change amount of the system frequency exceeds the dead zone to change to the frequency decrease side, PCS 30 sets reactive power Qx so as to proceed to further decrease the system frequency to output the lead reactive power (Qx>0).

As a result, when detecting the change in the system frequency beyond the dead zone, PCS 30 injects the reactive power in the direction that promotes the frequency change (increase or decrease). Then, while the reactive power in such the promoting direction is injected, when the frequency changes (rises or falls) by a certain amount without preventing the promotion in injecting the reactive power in such the promoting direction, the power transmission to AC power line 20 to which PCS 30 is connected is stopped, and it can be detected that PCS 30 is in the isolated operation state. When the isolated operation state is detected, PCS 30 operates to electrically disconnect AC power line 20 from distributed power supply 40. Thus, a function of preventing isolated driving is implemented.

Such the injection of reactive power Qx for the islanded operation detection is performed from a large number of PCSs 30 connected to AC power line 20, thereby generating voltage fluctuation (flicker) of the power system. Normally, power converter 110 in FIG. 1 configured by STATCOM or the like injects the delay reactive power (reactive current) in response to the system voltage increase on inductive AC power line 20 while supplying the lead reactive power (reactive current) in response to the system voltage decrease, so that the flicker is prevented. However, as described in NPLs 1 and 2 and the like, it is difficult to obtain a sufficient effect in such the normal system voltage compensation control (flicker prevention control).

For this reason, the flicker prevention device of the first embodiment attempts to prevent the flicker caused by PCS 30 by injecting the reactive power that compensates for the change in system frequency f with the intention of canceling reactive power Qx injected from PCS 30 in response to the change in system frequency f.

That is, control arithmetic unit 170 in FIG. 1 calculates reactive power instruction value Qref so as to compensate for input frequency change amount fchg. That is, reactive power instruction value Qref is set so as to output the lead reactive power decreasing the frequency in response to the increase in the system frequency (Qref>0) while being set so as to output the delay reactive power increasing the frequency in response to the decrease in the system frequency (Qref<0).

Figure 6:
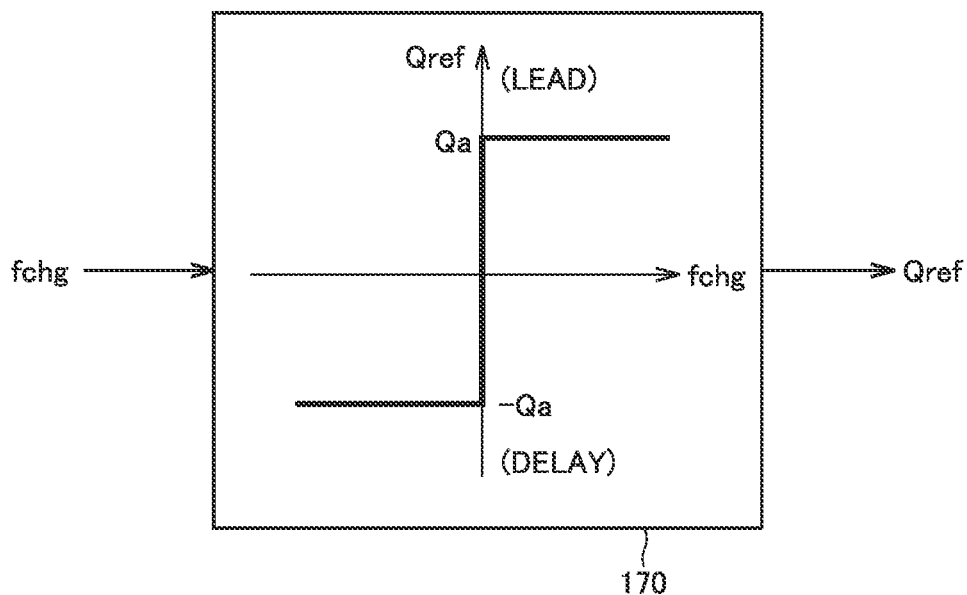
FIG. 6 is a conceptual diagram illustrating a first example of a control operation in a control arithmetic unit of FIG. 1.
Figure 7:
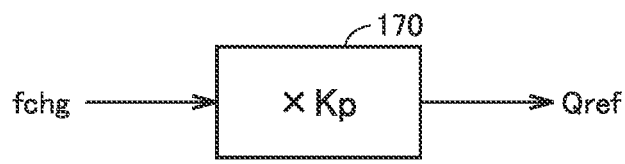
FIG. 7 is a conceptual diagram illustrating a second example of the control operation in the control arithmetic unit of FIG. 1.

FIGS. 6 and 7 illustrate examples of control operation examples by control arithmetic unit 170.

For example, as illustrated in FIG. 6, control arithmetic unit 170 can set Qref=Qa (Qref>0) in the case of fchg>0, and control arithmetic unit 170 can set Qref=−Qa (Qref<0) in the case of fchg<0.

As a result, when system frequency f increases (fchg>0), reactive power instruction value Qref of power converter 110 can be set such that a certain amount of lead reactive power Qa is injected into AC power line 20 until the system frequency turns to decrease. On the other hand, when system frequency f decreases (fchg<0), reactive power instruction value Qref is set so as to inject a certain amount of delay reactive power −Qa into AC power line 20 until the system frequency starts the increase.

FIG. 6 can be also modified so as to provide the dead zone in the region where the absolute value of frequency change amount fchg is smaller than a reference value (fx). In this case, Qref=−Qa can be satisfied in the case of fchg≤−fx, Qref=0 can be satisfied in the case of −fx<fchg<fx, and Qref=Qa can be satisfied in the case of fchg≥fx.

When the control operation example in FIG. 6 is applied, frequency change amount fchg can be calculated as binary data indicating whether the system frequency increases or decreases. Similarly, when the modification in which the dead zone is provided in FIG. 6 is applied, frequency change amount fchg can be calculated as ternary data in order to indicate whether the system frequency is increased, not changed, or decreased.

Alternatively, as illustrated in FIG. 7, control arithmetic unit 170 can set reactive power instruction value Qref by proportional (P) control according to the product of frequency change amount fchg and a proportional gain Kp (Qref=Kp·fchg). Also by the P control, the relationship between the polarity of frequency change amount fchg and the polarity of reactive power instruction value Qref is the same as that in FIG. 6, and it is understood that reactive power instruction value Qref is set (Qref>0) such that the lead reactive power is injected into AC power line 20 in response to the increase (fchg>0) in system frequency f, and reactive power instruction value Qref is set (Qref<0) such that the delay reactive power is injected into AC power line 20 in response to the decrease (fchg<0) in system frequency f. Furthermore, the magnitude of the injected reactive power is adjusted in accordance with the magnitude of the frequency change (|Qref|∝|fchg|), so that the control stability can be enhanced.

Figure 8:
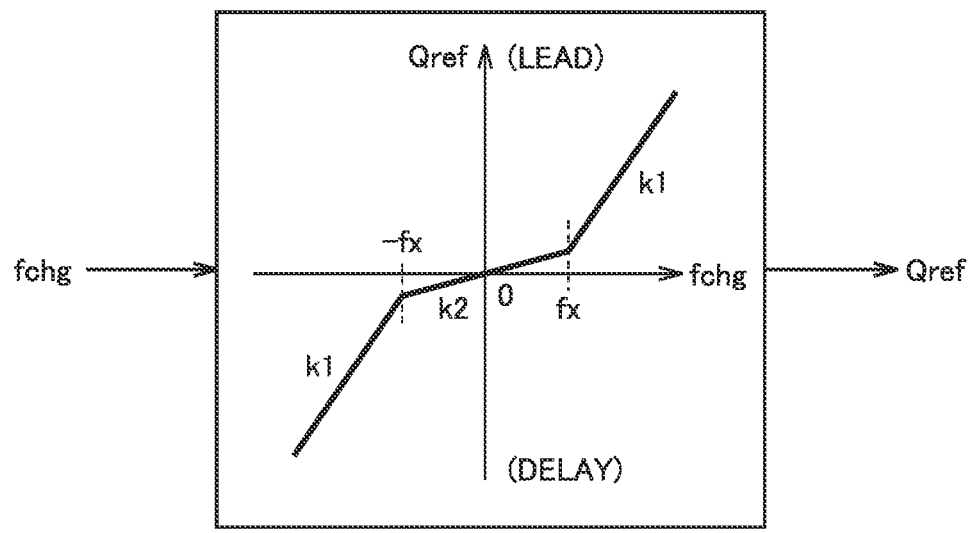
FIG. 8 is a conceptual diagram illustrating a first modification of gain setting in FIG. 7.
Figure 9:
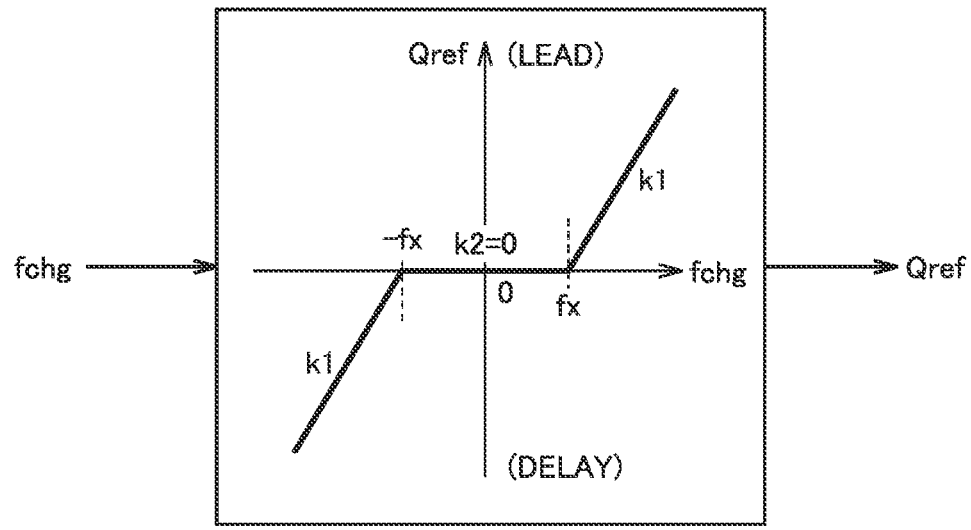
FIG. 9 is a conceptual diagram illustrating a second modification of the gain setting in FIG. 7.

Proportional gain Kp can be set as a modification of FIGS. 8 and 9.

In the modification of FIG. 8, proportional gain Kp is switched according to the magnitude of frequency change amount fchg. For example, proportional gain Kp=k1 can be set in a region where the absolute value of frequency change amount fchg is large, namely, fchg≥fx or fchg≤−fx, while proportional gain Kp=k2 (k2<k1) can be set in a region where the absolute value of the frequency change amount fchg is small, namely, −fx<fchg<fx.

In this way, the control response speed can be increased in the region where the absolute value (|fchg|) of the frequency change amount is large, and the control stability can be increased in the region where the absolute value (|fchg|) of the frequency change amount is small.

Alternatively, in the modification of FIG. 9, by setting k2=0 in FIG. 8, a dead zone in which reactive power instruction value Qref=0 can be provided in a region where the absolute value of frequency change amount fchg is small (−fx<fchg<fx). Thus, the control stability can be further enhanced.

In FIGS. 6 to 9, the control calculation example in which the polarities of frequency change amount fchg and reactive power instruction value Qref always are matched with each other at each point of time has been described. However, a case where the polarities of frequency change amount fchg and reactive power instruction value Qref are temporarily opposite to each other may be generated depending on the control method. However, even in such a case, when reactive power instruction value Qref is set such that the lead reactive power or the delay reactive power is injected into AC power line 20 as a whole in order to finally compensate for each increase (fchg>0) or decrease (fchg<0) in system frequency f, the flicker prevention effect can be obtained similarly to the control method described in FIGS. 6 to 9.

Furthermore, the definition of the lead and delay of the reactive power can also be different from that exemplified in the present specification. That is, when the reactive power having the phase in the frequency decreasing direction is injected in response to the increase in the system frequency and when the output of power converter 110 is controlled so as to output the reactive power having the phase in the frequency rising direction in response to the decrease in the system frequency, the same control as the example in the first embodiment can be implemented.

Figure 10:
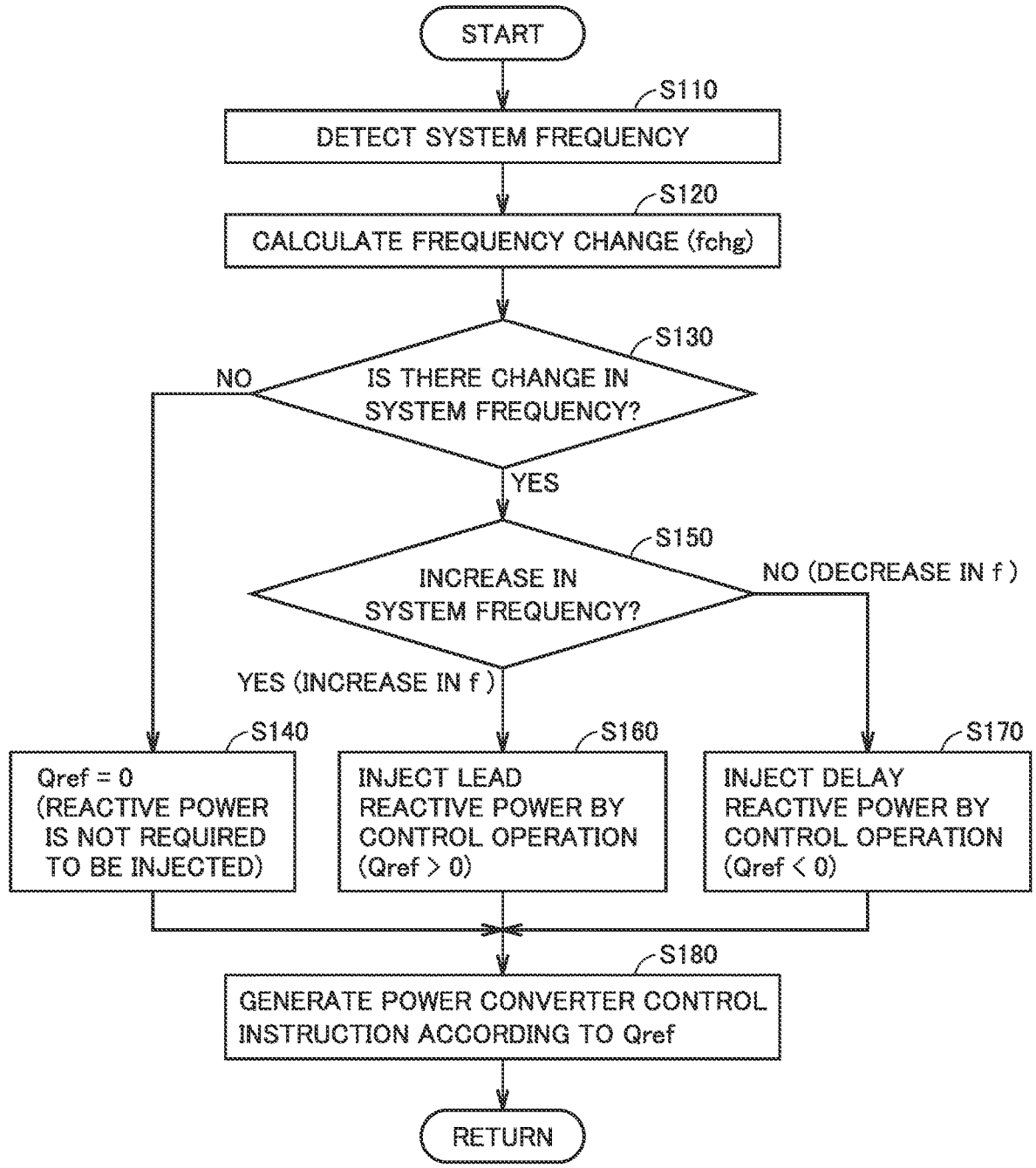
FIG. 10 is a first flowchart illustrating a flicker prevention control method of the first embodiment.

FIG. 10 is a first flowchart illustrating processing of the flicker prevention control by the flicker prevention device of the first embodiment. The flowchart in FIG. 10 is repeatedly executed at a predetermined control cycle by controller 150 when flicker prevention device 100 operates.

As illustrated in FIG. 10, when detecting system frequency fin step (hereinafter, simply referred to as "S") 110, controller 150 calculates frequency change amount fchg using system frequency fin S120. The processing in S110 can be implemented by receiving the output of frequency detector 120 in FIG. 1, and the processing in S120 is similar to that of frequency change amount calculation unit 160 in FIG. 1.

Furthermore, in S130, controller 150 determines whether there is a change in system frequency f based on frequency change amount fchg calculated in S120. When the change in system frequency f does not exist (NO in S130), reactive power instruction value Qref is set to 0 in S140. That is, reactive power instruction value Qref is set such that reactive power is not injected from power converter 110 (Qc=0).

When the change in system frequency f exists (YES in S130), controller 150 determines whether the change in system frequency f is an increase or a decrease in S150. For example, the determination in S150 can be executed based on the polarity of frequency change amount fchg.

In the case of coping with the increase in the system frequency (YES in S150), controller 150 calculates reactive power instruction value Qref (Qref>0) in S160 such that the lead reactive power is injected according to a predetermined control operation with frequency change amount fchg as input. On the other hand, in the case of coping with the decrease in the system frequency (NO in S150), controller 150 calculates reactive power instruction value Qref (Qref<0) in S170 such that the delay reactive power is injected in order to compensate for the decrease in the frequency according to a predetermined control calculation with frequency change amount fchg as input.

The pieces of processing in S130 to S170 can be integrally executed such that reactive power instruction value Qref is calculated from frequency change amount fchg by the control operation in control arithmetic unit 170 of FIG. 1.

Furthermore, controller 150 generates control instruction Scv of power converter 110 according to reactive power instruction value Qref calculated in S140, S160, or S170 by S180. When power converter 110 operates in accordance with control instruction Scv generated in S180, reactive power Qc according to reactive power instruction value Qref is injected into AC power line 20. That is, the processing of S180 is similar to that of power converter control unit 180 in FIG. 1.

Figure 11:
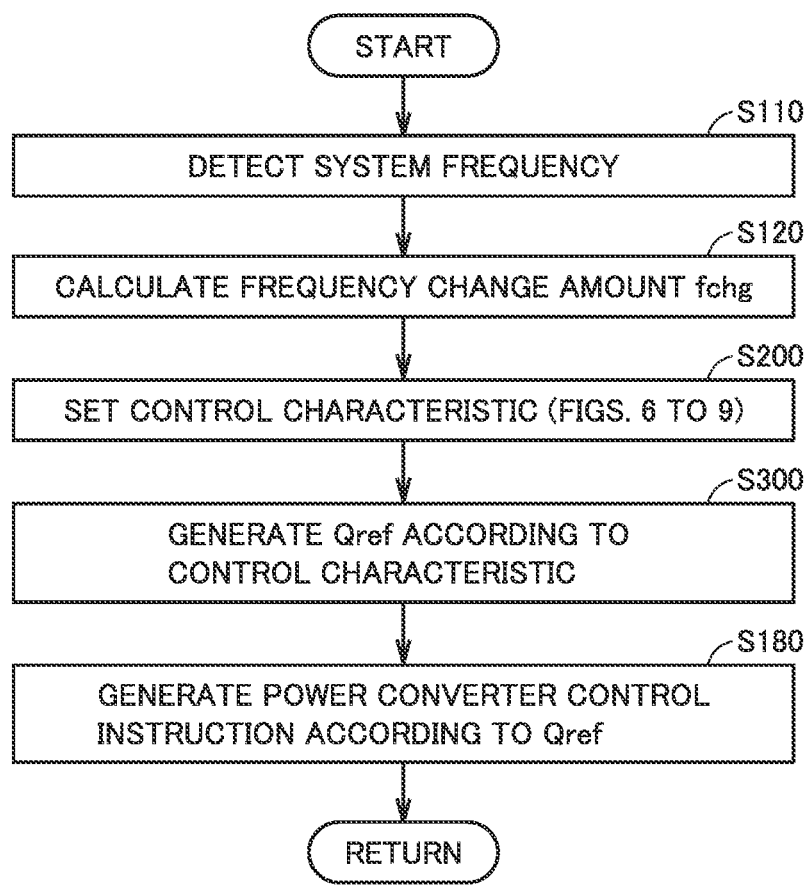
FIG. 11 is a second flowchart illustrating the flicker prevention control method of the first embodiment.

FIG. 11 is a second flowchart illustrating the processing of the flicker prevention control by the flicker prevention device of the first embodiment. In the flowchart of FIG. 11, the pieces of processing of S130 to S170 in the flowchart of FIG. 10 is described as processing (S200 and S300) of calculating reactive power instruction value Qref from frequency change amount fchg in control arithmetic unit 170 of FIG. 1.

Referring to FIG. 11, controller 150 detects frequency f and calculates frequency change amount fchg by S110 and S120 similar to those in FIG. 10.

In S200, controller 150 sets the control characteristic of the reactive power. For example, in S200, reactive power instruction value Qref (FIG. 6) or gain Kc (FIGS. 7 to 9) is set according to the characteristics in FIGS. 6 to 9 with frequency change amount fchg as the input. Gain Kc corresponds to proportional gain Kp in FIGS. 7 to 9. Furthermore, gain Kc is not limited to the gain of the proportional control, but means a gain of an arbitrary control method including proportional integral (PI) control or proportional integral derivative (PID) control. In the first embodiment, the control characteristic is set such that the polarities of frequency change amount fchg and reactive power instruction value Qref are matched with each other.

In step S300, controller 150 generates reactive power instruction value Qref according to the control characteristic (gain Kc or reactive power instruction value Qref) set in step S200. For example, in the proportional control, the control calculation of Qref=Kp·fchg is executed in S300 using proportional gain Kp which is gain Kc set in S200.

Further, controller 150 generates control instruction Scv of power converter 110 according to reactive power instruction value Qref calculated in S300 by S180 similar to that in FIG. 10. When power converter 110 operates in accordance with control instruction Scv, reactive power Qc according to reactive power instruction value Qref is injected into AC power line 20.

As described above, according to the flicker prevention device and the flicker prevention control method of the first embodiment, reactive power Qc output from power converter 110 to AC power line 20 is controlled with a new idea of compensating for the change (increase or decrease) in the system frequency, instead of directly compensating for the fluctuation (increase or decrease) in the system voltage resulting from the influence of reactive power Qx from PCS 30. As a result, when reactive power Qc controlled to cancel reactive power Qx output from PCS 30 according to the change in the system frequency is injected into the power system, the flicker caused by PCS 30 can be stably prevented at high speed.

Second Embodiment

In the first embodiment, the flicker prevention control in which the control characteristic of reactive power instruction value Qref with respect to frequency change amount fchg, specifically, the polarity (lead or delay of reactive power Qc) of reactive power instruction value Qref output from power converter 110 with respect to the polarity (positive or negative) of frequency change amount fchg is fixed has been described. In the second and subsequent embodiments, the flicker prevention control in which the control characteristic is switched according to the behavior of frequency change amount fchg will be described.

Figure 12:
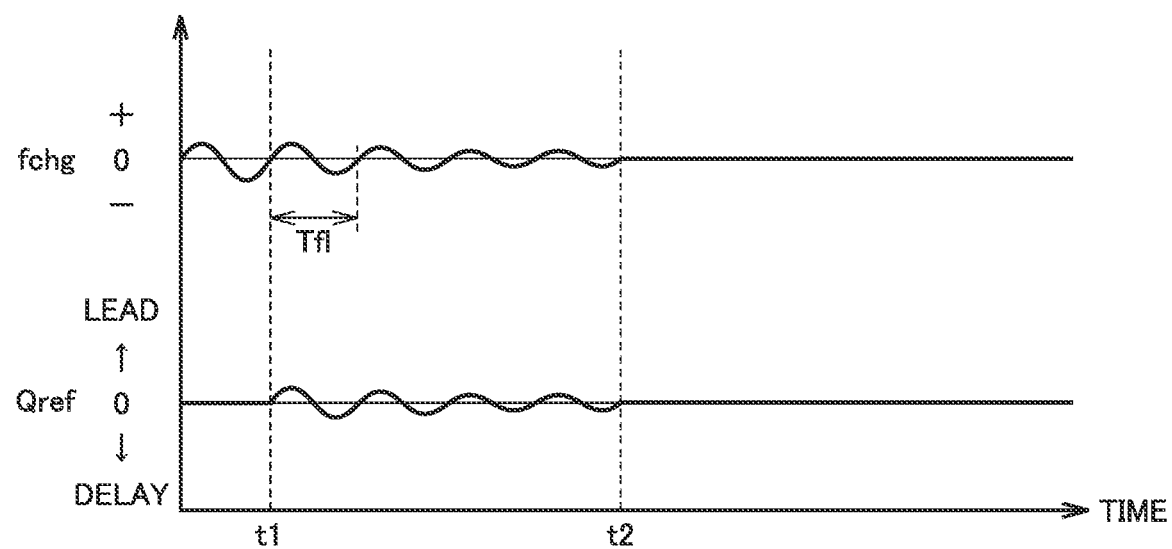
FIG. 12 is a conceptual waveform diagram illustrating a first behavior example of a frequency change amount with respect to flicker prevention control by a power converter.
Figure 13:
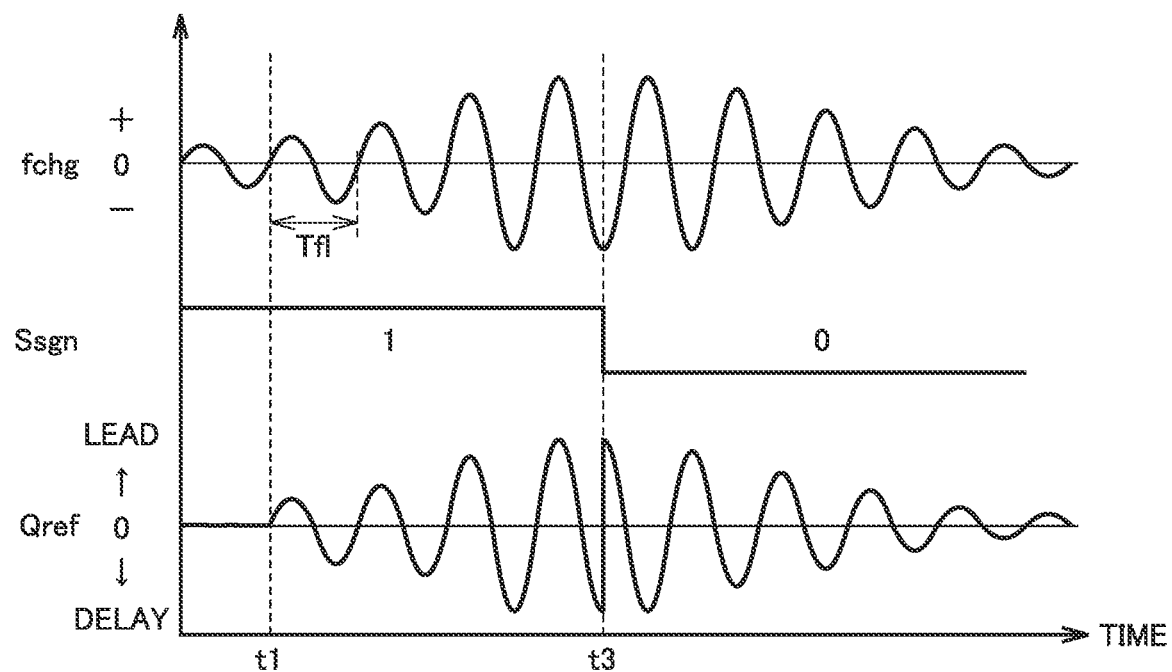
FIG. 13 is a conceptual waveform diagram illustrating a second behavior example of the frequency change amount with respect to the flicker prevention control by the power converter.

FIGS. 12 and 13 illustrate first and second examples of behavior of the frequency change amount with respect to the flicker prevention control of the second embodiment.

In the first behavior example of FIG. 12, the flicker prevention control of generating reactive power instruction value Qref according to the polarity described in the first embodiment is started from a time t1 with respect to the periodic variation (flicker) in which frequency change amount fchg changes in a flicker period Tfl. That is, reactive power Qc output from power converter 110 is controlled in accordance with reactive power instruction value Qref generated such that the lead reactive power is injected for fchg>0 and such that the delay reactive power is injected for fchg<0. As described in the first embodiment, the phase (90 degree phase advance or 90 degree phase delay) of the reactive power is defined by the polarity (positive or negative) of reactive power instruction value Qref, and the magnitude (amplitude) of the reactive power is defined by the absolute value of reactive power instruction value Qref.

In the first behavior example, the amplitude of frequency change amount fchg gradually decreases by the injection of reactive power Qc according to such the control characteristic, and the flicker is decreased. In response to this, the absolute value of reactive power instruction value Qref also gradually decreases, and after a time t2, the flicker is eliminated and Qref=0 is set.

On the other hand, in the second behavior example of FIG. 13, when the injection of reactive power Qc controlled according to the control characteristic similar to that of the first example is started at time t1, the amplitude of frequency change amount fchg gradually increases after time t1, and a phenomenon in which the flicker is conversely deteriorated is generated. The inventors have found that the behavior in FIG. 13 can be generated depending on the change in the situation of the power system, for example, the change in impedance from an interconnection point of power converter 110 on AC power line 20 to PCS 30 that is actually outputting reactive power. For this reason, the control of the second embodiment is introduced. Specifically, when the impedance of AC power line 20 between power converter 110 and PCS 30 generating the flicker is large, the phase does not match between frequency change amount fchg detected by power converter 110 and the frequency change amount detected by PCS 30 due to action of the voltage drop caused by the impedance, and the case can vibrate in the opposite polarity.

In this case, as illustrated before a time t3 in FIG. 13, when the control characteristic in which the polarities of frequency change amount fchg and reactive power instruction value Qref are matched with each other is selected, the reactive power injected from each of power converter 110 and PCS 30 is added without canceling each other, and thus the flicker increases. On the other hand, as illustrated after time t3 in FIG. 13, when the control characteristic in which the polarities of frequency change amount fchg and reactive power instruction value Qref are inverted is selected, the reactive powers injected from power converter 110 and PCS 30 cancel each other, so that the frequency change amount at the interconnection point of PCS 30 decreases. Thus, the flicker can be decreased.

Figure 14:
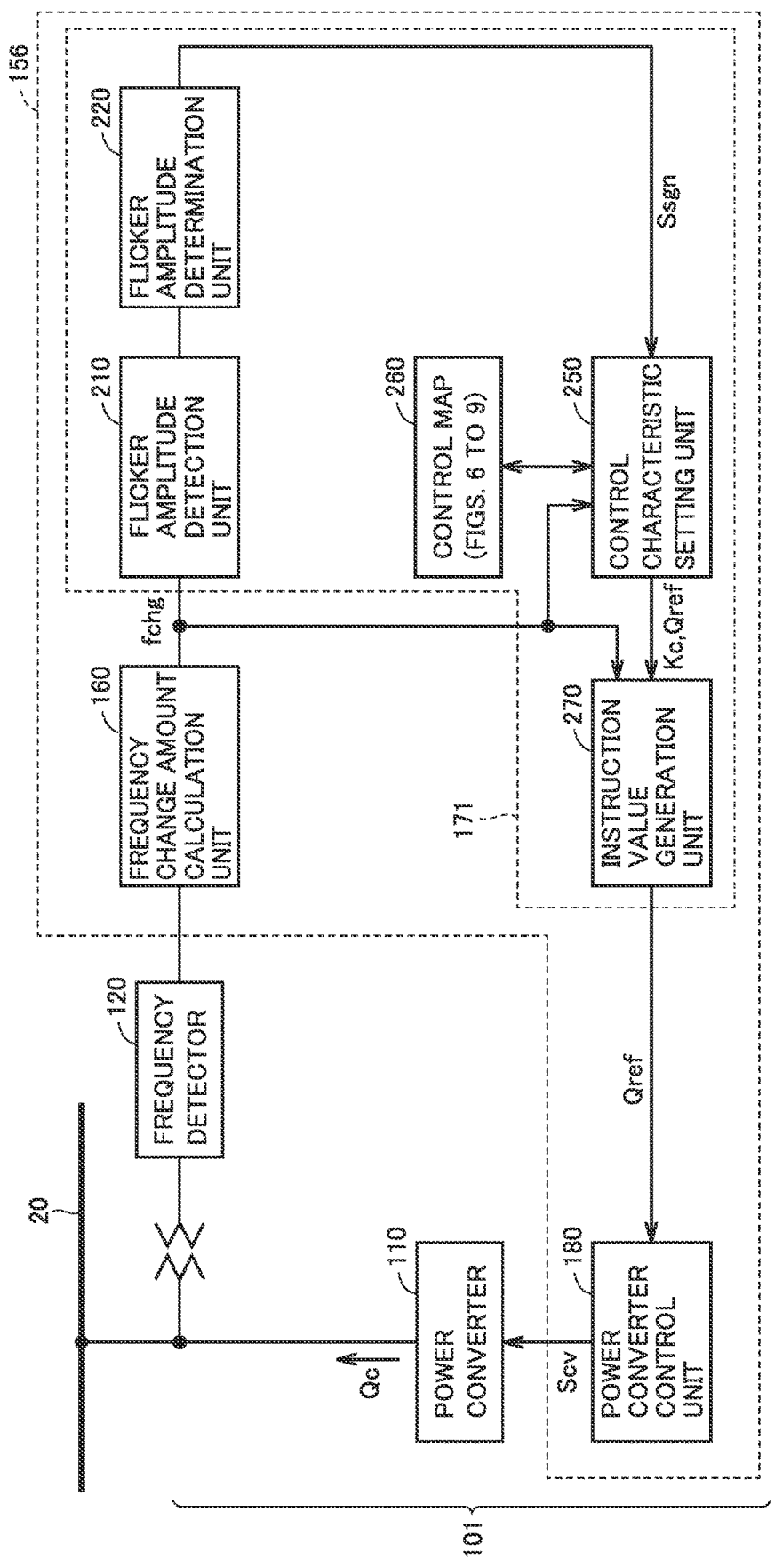
FIG. 14 is a schematic block diagram illustrating a configuration of a flicker prevention device according to a second embodiment.

FIG. 14 is a schematic block diagram illustrating a configuration of a flicker prevention device 101 of the second embodiment.

As illustrated in FIG. 14, flicker prevention device 101 of the second embodiment is different from flicker prevention device 100 in FIG. 1 in that a controller 156 is included instead of controller 150. Controller 156 is different from controller 150 in FIG. 1 in that a control arithmetic unit 171 is included instead of control arithmetic unit 170.

Control arithmetic unit 171 includes a flicker amplitude detection unit 210, a flicker amplitude determination unit 220, a control characteristic setting unit 250, a control map 260, and an instruction value generation unit 270.

Flicker amplitude detection unit 210 calculates a parameter value representing the magnitude of the flicker amplitude from the temporal change in frequency change amount fchg calculated by frequency change amount calculation unit 160. Flicker amplitude determination unit 220 uses the parameter value calculated by flicker amplitude detection unit 210 to determine which phenomenon of flicker increase or flicker decrease is generated, and generates a control signal Ssgn for selecting the control characteristic based on the determination result.

As described above, flicker amplitude detection unit 210 and flicker amplitude determination unit 220 are provided to determine which of the first behavior example (flicker prevention) of FIG. 12 and the second behavior example (flicker increase) of FIG. 13 occurs during the injection of reactive power Qc.

Figure 15:
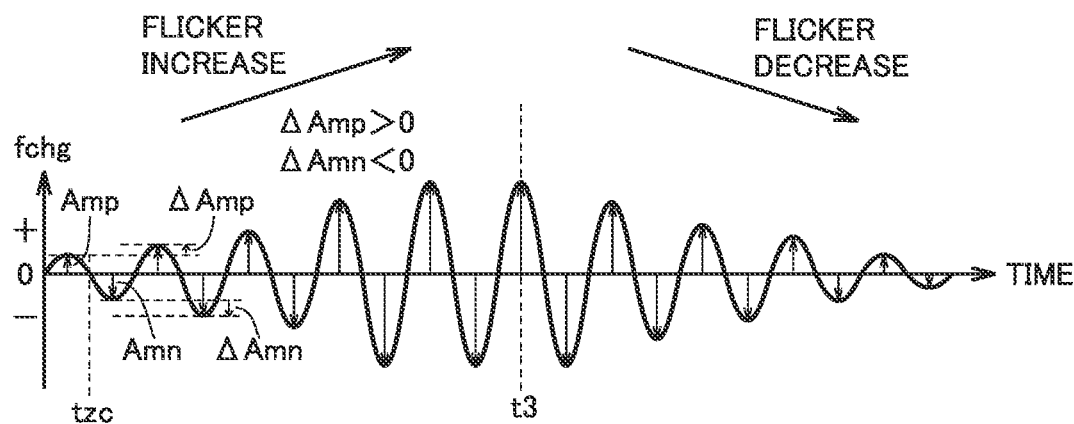
FIG. 15 is a conceptual waveform diagram illustrating a first determination example of a flicker amplitude.

FIG. 15 is a conceptual waveform diagram describing a first determination example of the flicker amplitude.

With reference to FIG. 15, flicker amplitude detection unit 210 detects zero cross timing tzc of frequency change amount fchg calculated by frequency change amount calculation unit 160. Then, the larger one of the absolute values of the maximum value and the minimum value of frequency change amount fchg in the period between the two zero crossing points is extracted as the positive or negative amplitude value in the period.

As a result, every time zero-cross timing tzc is detected, flicker amplitude detection unit 210 calculates a positive amplitude value Amp or a negative amplitude value Amn in the period between zero-cross timing tzc and the previous zero-cross timing as the parameter value described above. That is, positive amplitude value Amp or negative amplitude value Amn is calculated for each (½) period of flicker period Tfl in FIGS. 12 and 13.

Every time flicker amplitude detection unit 210 calculates positive amplitude value Amp (Amp>0), flicker amplitude determination unit 220 calculates a change amount ΔAmp from the previous positive amplitude value. Specifically, change amount ΔAmp is calculated by subtracting the previous calculated value from the current calculated value of positive amplitude value Amp.

Similarly, every time flicker amplitude detection unit 210 calculates negative amplitude value Amn (Amn<0), flicker amplitude determination unit 220 calculates change amount ΔAmn from the previous negative amplitude value. Specifically, change amount ΔAmn is calculated by subtracting the previous calculated value from the current calculated value of negative amplitude value Amn. Therefore, each of change amounts ΔAmp and ΔAmn is updated at a period equivalent to flicker cycle Tfl.

For example, in the period up to time t3 at which the flicker amplitude is increased, every time flicker amplitude detection unit 210 calculates the parameter value, positive amplitude value Amp increases and negative amplitude value Amn decreases (|Amn| increases). Therefore, flicker amplitude determination unit 220 detects the increase in the flicker amplitude when change amount ΔAmp is positive and change amount ΔAmn is negative. Thus, the increase in the flicker amplitude is detected in the period up to time t3. When the increase in the flicker amplitude is continuously detected over a plurality of predetermined flicker periods, flicker amplitude determination unit 220 determines that the flicker amplitude is increased.

On the other hand, in the period after time t3, the flicker amplitude is decreased. In this period, every time flicker amplitude detection unit 210 calculates the parameter value, positive amplitude value Amp decreases and negative amplitude value Amn increases (|Amn| decreases). Therefore, flicker amplitude determination unit 220 detects the decrease in the flicker amplitude when change amount ΔAmp is negative and change amount ΔAmn is positive. Thus, the decrease in the flicker amplitude is detected in the period after time t3. In this case, flicker amplitude determination unit 220 determines that the flicker amplitude does not increase.

Figure 16:
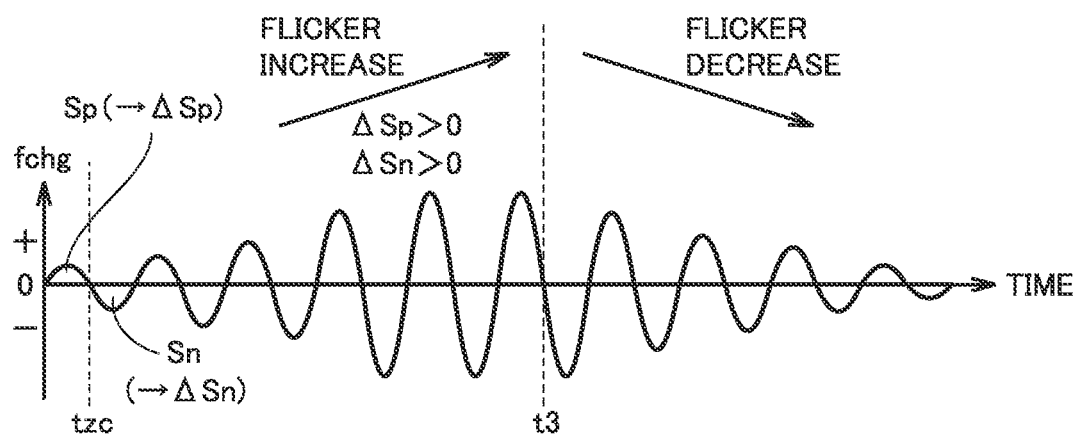
FIG. 16 is a conceptual waveform diagram illustrating a second determination example of the flicker amplitude.

FIG. 16 is a conceptual waveform diagram describing a second determination example of the flicker amplitude.

Referring to FIG. 16, flicker amplitude detection unit 210 calculates the integral value of frequency change amount fchg in the period between the two zero cross points similar to FIG. 15, namely, in the time length corresponding to the (½) period of flicker period Tfl. Specifically, while a positive integral value Sp (Sp>0) is calculated in the period of fchg>0, a negative integral value Sn (Sn<0) is calculated in the period of fchg<0.

Thus, every time zero-cross timing tzc is detected, flicker amplitude detection unit 210 calculates positive integral value Sp or negative integral value Sn in the period between zero-cross timing tzc and the previous zero-cross timing as the parameter value described above. Also in FIG. 16, positive integral value Sp or negative integral value Sn is calculated for each (½) period of flicker period Tfl.

Every time flicker amplitude detection unit 210 calculates positive integrated value Sp (Sp>0), flicker amplitude determination unit 220 calculates a change amount ΔSp from the previous positive integrated value. Specifically, change amount ΔSp is calculated by subtracting the previous calculation value from the current calculation value of positive integral value Sp.

Similarly, every time flicker amplitude detection unit 210 calculates negative integrated value Sn (Sn<0), flicker amplitude determination unit 220 calculates a change amount ΔSn from the previous negative integrated value. Specifically, change amount ΔSn is calculated by subtracting the previous calculation value from the current calculation value of negative integral value Sn. Accordingly, each of change amounts ΔSp and ΔSn is also updated at the period equivalent to flicker period Tfl.

In the period up to time t3 in which the flicker amplitude is increased as in FIG. 15, every time flicker amplitude detection unit 210 calculates the parameter value, positive integrated value Sp increases and negative integrated value Sn decreases (|Sn| increases). Accordingly, flicker amplitude determination unit 220 detects the increase in the flicker amplitude when change amount ΔSp is positive and when change amount ΔSp is negative. Thus, also in FIG. 16, the increase of the flicker amplitude is detected in the period up to time t3. Similarly to FIG. 15, when the increase of the flicker amplitude is continuously detected over a plurality of predetermined flicker cycles, it can be determined that the flicker amplitude increases.

On the other hand, in the period after time t3 in which the flicker amplitude is decreased as in FIG. 15, every time flicker amplitude detection unit 210 calculates the parameter value, positive integrated value Sp decreases and negative integrated value Sn increases (|Sn| decreases). Accordingly, flicker amplitude determination unit 220 detects the decrease in the flicker amplitude when change amount ΔSp is negative and when change amount ΔSn is positive. Thus, also in FIG. 16, the decrease in the flicker amplitude can be detected in the period after time t3.

With reference again to FIG. 14, control signal Ssgn generated based on the determination result described above by flicker amplitude determination unit 220 is input to control characteristic setting unit 250. The initial value of control signal Ssgn is "1". When Ssgn=1, control characteristic setting unit 250 sets the control characteristic of reactive power instruction value Qref for frequency change amount fchg in the same manner as in the first embodiment. That is, in the case of Ssgn=1, reactive power Qc is controlled such that the lead reactive power is injected for fchg>0 while the delay reactive power is injected for fchg<0, so that the control characteristic is set such that the polarities (positive or negative) of frequency change amount fchg and reactive power instruction value Qref become the same. The control characteristic selected in the case of Ssgn=1 corresponds to the "first control characteristic".

On the other hand, in the case of Ssgn=0, control characteristic setting unit 250 inverts the control characteristic of reactive power instruction value Qref for frequency change amount fchg with respect to the first embodiment. That is, in the case of Ssgn=0, reactive power Qc is controlled such that the delay reactive power is injected for fchg>0 while the lead reactive power is injected for fchg<0, so that the control characteristic is set such that the polarities (positive or negative) of frequency change amount fchg and reactive power instruction value Qref are opposite. The control characteristic selected in the case of Ssgn=0 corresponds to the "second control characteristic".

Control map 260 stores a characteristic line setting reactive power instruction value Qref or gain Kc (proportional gain Kp) with respect to frequency change amount fchg in the case of Ssgn=1. For example, the characteristic line in any one of FIGS. 6 to 9 is stored in control map 260.

Control characteristic setting unit 250 sets gain Kc or reactive power instruction value Qref using the reference value of control map 260 with respect to frequency change amount fchg and control signal Ssgn. Specifically, in the case of Ssgn=1, gain Kc or reactive power instruction value Qref is set according to the reference value of control map 260.

On the other hand, in the case of Ssgn=0, control characteristic setting unit 250 sets gain Kc or reactive power instruction value Qref by multiplying the reference value of control map 260 by −1, namely, inverting the polarity (sign).

Instruction value generation unit 270 generates reactive power instruction value Qref using gain Kc or reactive power instruction value Qref set by control characteristic setting unit 250. For example, when the proportional gain is set as gain Kc by control characteristic setting unit 250, instruction value generation unit 270 generates reactive power instruction value Qref by the operation of Qref=Kc· fchg.

When control characteristic setting unit 250 directly sets reactive power instruction value Qref according to control map 260 in accordance with FIG. 6, instruction value generation unit 270 can set the set value by control characteristic setting unit 250 as reactive power instruction value Qref as it is.

Figure 17:
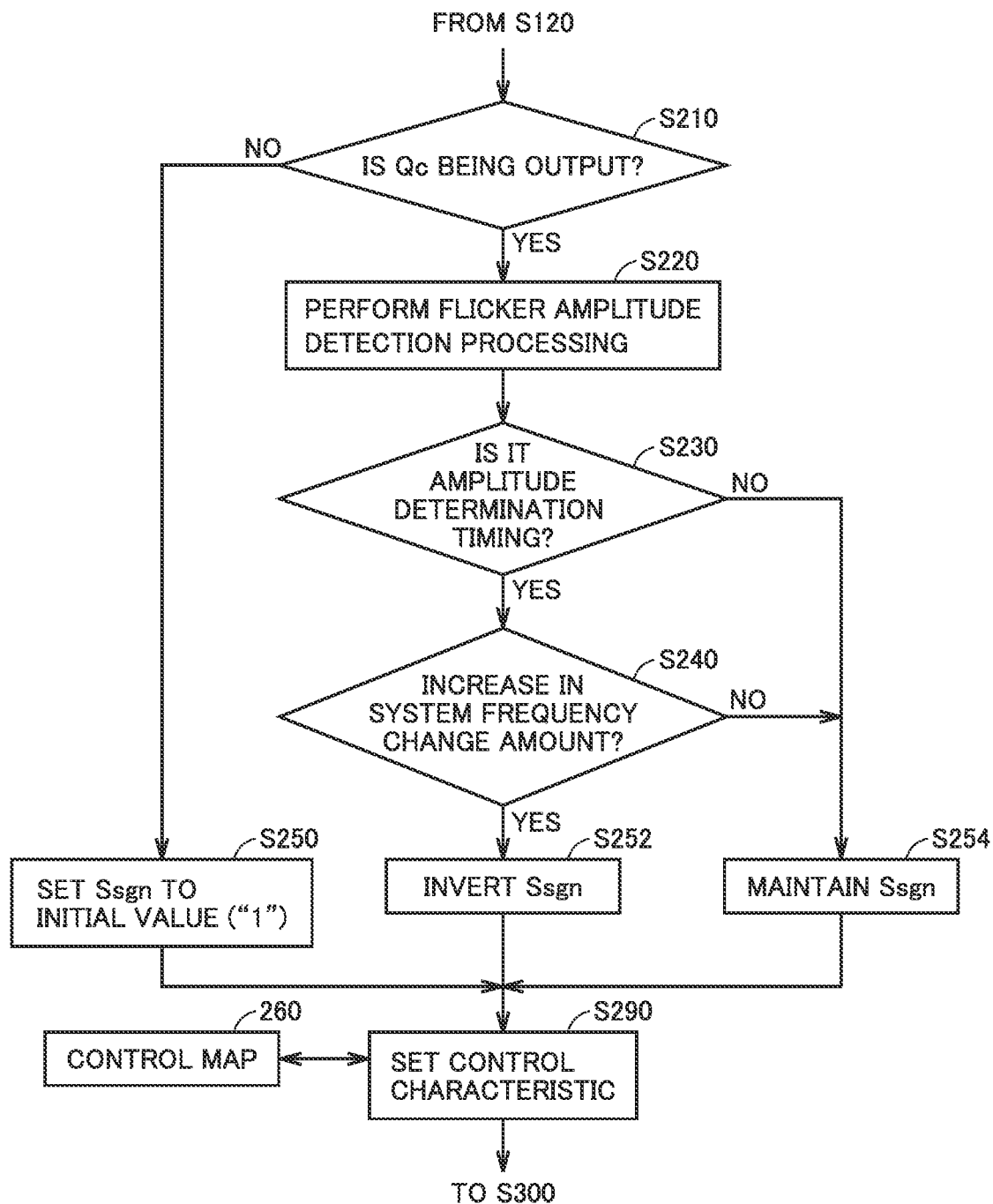
FIG. 17 is a flowchart illustrating control characteristic setting processing in the flicker prevention control method of the second embodiment.

FIG. 17 is a flowchart illustrating a control characteristic setting processing in the flicker prevention control method of the second embodiment. In the second embodiment, S200 in FIG. 11 is configured by S210 to S290 in FIG. 17.

With reference to FIG. 17, controller 156 determines whether reactive power Qc is being output in S210. In the case of |Qref|>ε (ε: determination value), the affirmative determination is made in S210. For example, the affirmative determination is made in step S210 between times t1 to t2 in FIG. 12 and between times t1 to t3 in FIG. 13. In a non-output period of reactive power Qc (NO in S210), control signal Ssgn is set to the initial value in S250 (Ssgn=1).

Controller 156 executes the flicker amplitude detection processing in S220 during the output period of reactive power Qc (YES in S210). For example, in S220, the zero-cross point detection processing, the maximum value or minimum value update processing obtaining the positive or negative amplitude values Amp, Amn, or the integration processing calculating the positive or negative integral values Sp, Sn in FIGS. 15 and 16 are performed. The function of flicker amplitude detection unit 210 (FIG. 14) is implemented by the processing of S220.

In step S230, controller 156 determines whether it is the amplitude determination timing. In the example described in FIGS. 15 and 16, the affirmative determination is made in S230 at each zero cross timing tzc.

At the amplitude determination timing (YES in S230), controller 156 determines in S240 whether the change amount of the system frequency increases depending on whether the flicker amplitude increases. As described above, the affirmative determination is made in S240 when the increase in the flicker amplitude is continuously detected over the plurality of predetermined flicker periods, and the negative determination is made in S240 otherwise. For example, in the example of FIG. 13, the affirmative determination is made in S240 at time t3. At timing other than the amplitude determination timing (NO in S230), control signal Ssgn is maintained at the current value in S254.

When the increase in the flicker amplitude is not detected in S240 (NO in S240), controller 156 maintains control signal Ssgn at the current value in S254. On the other hand, when the increase in the change amount of the system frequency is detected in S240 (YES in S240), controller 156 inverts control signal Ssgn in S252. As described above, the function of flicker amplitude determination unit 220 (FIG. 14) is implemented by the pieces of processing of S230 to S254.

In S290, controller 156 sets the control characteristic (for example, gain Kc or reactive power instruction value Qref) using control signal Ssgn set in S250, S252, S254 and the reference value of control map 260. That is, the function of control characteristic setting unit 250 (FIG. 14) is implemented by the processing in S250.

In the example of FIG. 13, before time t1, the negative determination is made in S210, and Ssgn=1 (initial value) is set. In timed t1 to t3, the negative determination is made in S230 or S240, Ssgn=1 is maintained, and similarly to the first embodiment, the control characteristic is set such that the lead reactive power is injected for fchg>0 while the delay reactive power is injected for fchg<0.

However, as a result of controlling the reactive power according to the control characteristics, when the increase in the frequency change amount is detected at time t3, the affirmative determination is made in S240, control signal Ssgn is inverted, and Ssgn=0 is set. As a result, after time t3, contrary to the first embodiment, the control characteristic is set such that the delay reactive power is injected for fchg>0 and the lead reactive power is injected for fchg<0. Thus, after time t3, reactive power Qc according to reactive power instruction value Qref is output from power converter 110, so that the flicker is decreased.

In the example of FIG. 12, Ssgn=1 is initially set at time t1, and then the affirmative determination is made in S240 after time t1. Therefore, reactive power Qc output from power converter 110 is controlled according to the same control characteristics as in the first embodiment while Ssgn=1 is maintained. Thus, after time t2, the flicker disappears and the output of the reactive power is also stopped (Qref=0). Even after time t2, control signal Ssgn is set to Ssgn=1 in S250.

The switching from Ssgn=1 to Ssgn=0 is illustrated in FIG. 13. However, according to the control processing of FIG. 17, when the frequency change amount (flicker amplitude) increases while reactive power Qc is controlled with the control characteristic according to Ssgn=0, reactive power Qc output from power converter 110 can be controlled by switching from Ssgn=0 to Ssgn=1.

As described above, according to the flicker prevention device and the flicker prevention control method of the second embodiment, in the flicker prevention control described in the first embodiment in which the change (increase or decrease) in the system frequency is compensated by the injection of the reactive power from power converter 110 to AC power line 20, the control characteristic of the reactive power, namely, the polarity (advance or delay of reactive power Qc) of reactive power instruction value Qref can be selected with respect to the polarity (positive or negative) of frequency change amount fchg according to the behavior of the flicker. Specifically, the polarity of the reactive power injected from power converter 110 can be appropriately selected so as to decrease the change amount of the system frequency detected by PCS 30 in consideration of the action of the voltage drop caused by the impedance between the interconnection point of power converter 110 and the interconnection point of PCS 30 on AC power line 20. As a result, the flicker caused by PCS 30 can be stably prevented at high speed even when the situation of the power system changes.

Modification of Second Embodiment

Figure 18A:
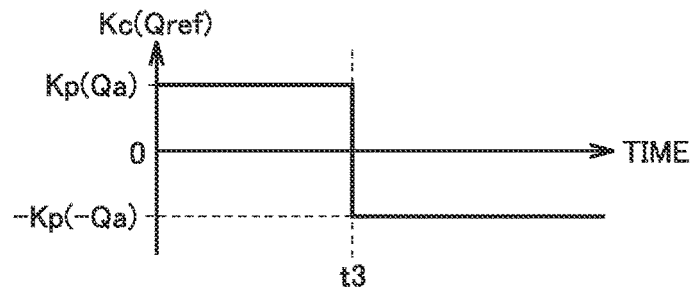
FIG. 18A is a waveform diagram illustrating output of a control characteristic setting unit of the second embodiment.

FIG. 18A is a waveform diagram illustrating the output of the control characteristic setting unit in the flicker prevention control of the second embodiment.

With reference to FIG. 18A, similarly to FIG. 13, when the increase in the flicker amplitude is detected at time t3 to invert control signal Ssgn, the control characteristic is switched to invert the polarity of gain Kc or reactive power instruction value Qref. Thus, when the proportional gain is switched from Kp to −Kp or the reactive power instruction value is switched from Qa to −Qa at time t3, the polarity of reactive power instruction value Qref is inverted while the absolute value is maintained.

Such switching of the control characteristic means that the phase of reactive power Qc output from power converter 110 rapidly changes between the delay phase and the lead phase while the magnitude (amplitude) is maintained. There is a fear that such the sudden change in reactive power Qc causes a fluctuation in the voltage or current of AC power line 20 to affect the system.

Figure 18B:
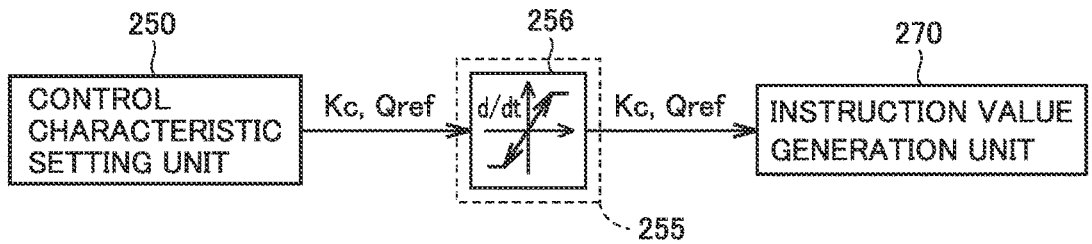
FIG. 18B is a block diagram illustrating a first configuration example of a flicker prevention control device according to a modification of the second embodiment.

FIG. 18B is a block diagram illustrating a first configuration example of a flicker prevention control device according to a modification of the second embodiment.

In the modification of the second embodiment, switching relaxation processing unit 255 is disposed between control characteristic setting unit 250 and instruction value generation unit 270. The configuration of the flicker control device of the modification of the second embodiment is similar to that of the second embodiment except that switching relaxation processing unit 255 is disposed.

In FIG. 18B, switching relaxation processing unit 255 includes a change rate limiting unit 256. Change rate limiting unit 256 receives reactive power instruction value Qref or gain Kc set by control characteristic setting unit 250, and outputs reactive power instruction value Qref or gain Kc in which the change rate is restricted.

Figure 18C:
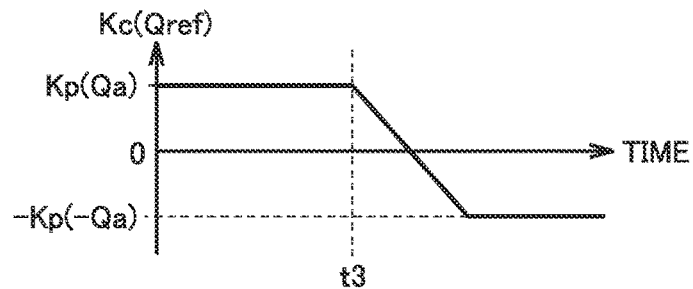
FIG. 18C is a waveform diagram illustrating an output value of a switching relaxation processing unit in FIG. 18B.

As illustrated in FIG. 18C, when the proportional gain output from control characteristic setting unit 250 changes from Kp to −Kp at time t3, change rate limiting unit 256 gradually changes the output value after time t3 from Kp to −Kp according to a predetermined constant change rate.

Similarly, even when the reactive power instruction value output from control characteristic setting unit 250 changes from Qa to −Qa at time t3, change rate limiting unit 256 gradually changes the output value after time t3 from Qa to −Qa according to a preset constant change rate.

Figure 18D:
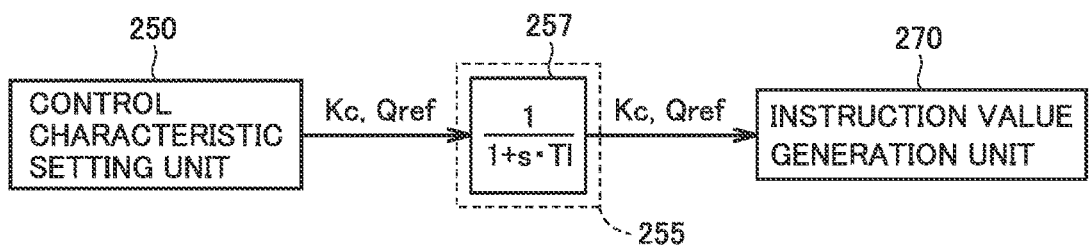
FIG. 18D is a block diagram illustrating a second configuration example of the flicker prevention control device according to the modification of the second embodiment.

As illustrated in FIG. 18D, switching relaxation processing unit 255 may include a low pass filter (LPF) 257. LPF 257 receives reactive power instruction value Qref or gain Kc set by control characteristic setting unit 250, and outputs reactive power instruction value Qref or gain Kc changed according to the previously-set frequency characteristic $1/(1+s \cdot T1)$.

Figure 18E:
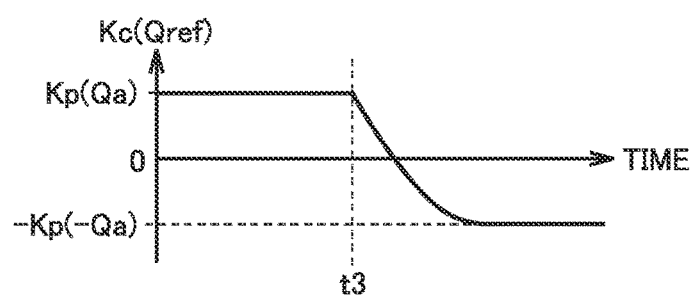
FIG. 18E is a waveform diagram illustrating an output value of the switching relaxation processing unit in FIG. 18D.

As illustrated in FIG. 18E, when the proportional gain output from control characteristic setting unit 250 changes from Kp to −Kp at time t3, LPF 257 blunts the output value after time t3 according to a previously-set frequency characteristic (time constant T1) and gradually changes from Kp to −Kp.

Similarly, even when the reactive power instruction value output from control characteristic setting unit 250 changes from Qa to −Qa at time t3, LPF 257 blunts the output value after time t3 according to the previously-set frequency characteristic (time constant T1) and gradually changes from Qa to −Qa.

Figure 19:
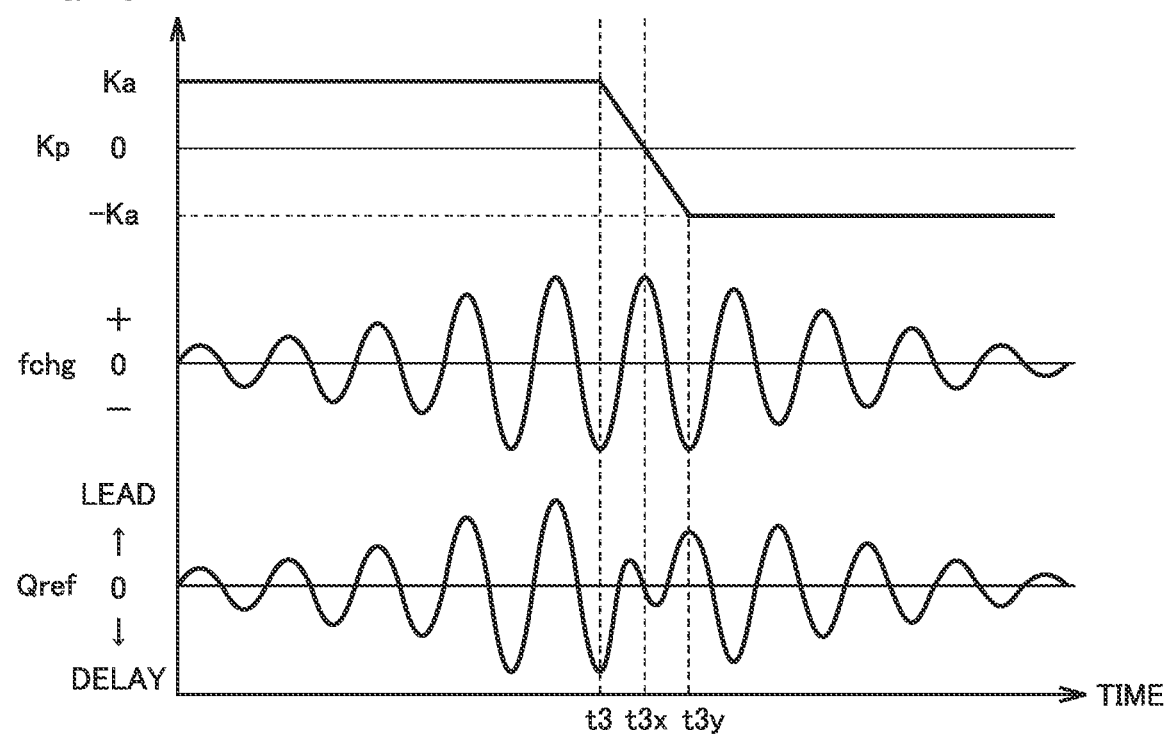
FIG. 19 is a waveform diagram illustrating an operation example of the flicker prevention control according to the modification of the second embodiment.

FIG. 19 is a waveform diagram illustrating an operation example of the flicker prevention control according to the modification of the second embodiment. FIG. 19 illustrates an operation example when change rate limiting unit 256 in FIG. 18B is applied as switching relaxation processing unit 255 to proportional gain Kp set by control characteristic setting unit 250.

With reference to FIG. 19, at time t3, proportional gain Kp set by control characteristic setting unit 250 changes from Ka to −Ka. On the other hand, the value of proportional gain Kp output from switching relaxation processing unit 255 decreases from Ka at a constant rate, and becomes Kp=0 at time t3x. At time t3x, proportional gain Kp becomes a negative value, and thereafter, proportional gain Kp decreases at a constant rate and reaches −Ka at time t3y.

Reactive power instruction value Qref is calculated by multiplying proportional gain Kp output from switching mitigation processing unit 255 by frequency change amount fchg. As a result, the period in which the ratio of the absolute value (that is, the amplitude of reactive power Qc) of reactive power instruction value Qref to the absolute value of frequency change amount fchg is temporarily decreased is provided from time t3 at which the control characteristic is switched to time t3y at which the relaxation of the change in proportional gain Kp by switching relaxation processing unit 255 is ended. Thus, a sudden change in the reactive power injected into AC power line 20 can be avoided at the time of the change in the control characteristic starting from time t3.

As described above, in the flicker prevention control device of the modification of the second embodiment, at the time of switching the control characteristic, namely, at the time of changing the phase of reactive power Qc output from power converter 110 from the delay phase to the lead phase or from the lead phase to the delay phase, the phase can be inverted together with the decrease in the amplitude of the reactive power, so that the influence on the system can be prevented.

In addition, in FIGS. 18B and 18D, the configuration example in which switching mitigation processing unit 255 is disposed between control characteristic setting unit 250 and instruction value generation unit 270 has been described. However, switching mitigation processing unit 255 can obtain a similar effect even when switching mitigation processing unit 255 is disposed at the subsequent stage of instruction value generation unit 270 in FIG. 14. In this case, reactive power instruction value Qref output from instruction value generation unit 270 is input to switching relaxation processing unit 255, and power converter control unit 180 generates control instruction Scv of power converter 110 according to reactive power instruction value Qref output from switching relaxation processing unit 255.

Third Embodiment

In a third embodiment, another example of the control of switching the control characteristic according to the flicker behavior described in the second embodiment will be described.

Figure 20:
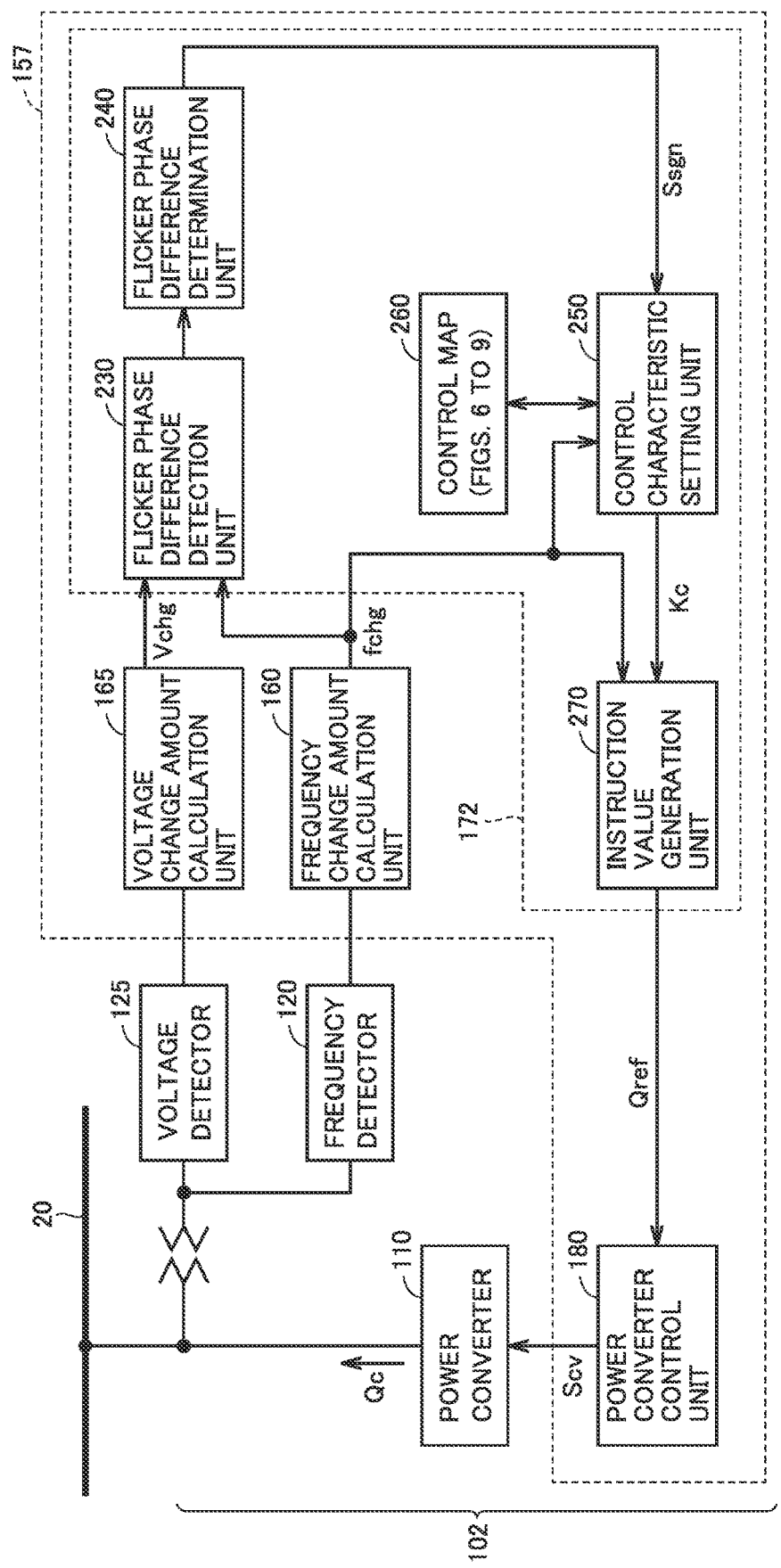
FIG. 20 is a schematic block diagram illustrating a configuration of a flicker prevention device according to a third embodiment.

FIG. 20 is a schematic block diagram illustrating a configuration of a flicker prevention device 102 of the third embodiment.

As illustrated in FIG. 20, flicker prevention device 102 of the third embodiment is different from flicker prevention device 101 in FIG. 14 in that flicker prevention device 102 further includes a voltage detector 125 and includes a controller 157 instead of controller 156. Controller 157 is different from controller 156 in FIG. 14 in that controller 157 further includes a voltage change amount calculation unit 165 and includes a control arithmetic unit 172 instead of control arithmetic unit 171.

Voltage detector 125 detects a system voltage effective value V, which is an effective value of the voltage, from the AC voltage waveform on AC power line 20. Voltage change amount calculation unit 165 calculates a voltage change amount Vchg indicating the change (increase or decrease) in system voltage effective value V using system voltage effective value V detected by voltage detector 125. For example, voltage change amount calculation unit 165 can be implemented by setting the input of system voltage effective value V instead of system frequency f with respect to the configuration similar to that of frequency change amount calculation unit 160.

Control arithmetic unit 172 includes a flicker phase difference detection unit 230, a flicker phase difference determination unit 240, a control characteristic setting unit 250, a control map 260, and an instruction value generation unit 270.

Flicker phase difference detection unit 230 calculates the parameter value representing a phase difference (flicker phase difference) between frequency change amount fchg that periodically changes according to licker period Tfl and voltage change amount Vchg from the temporal change in frequency change amount fchg calculated by frequency change amount calculation unit 160 and the temporal change in voltage change amount Vchg calculated by voltage change amount calculation unit 165. Flicker phase difference determination unit 240 uses the parameter value calculated by flicker phase difference detection unit 230 to determine whether frequency change amount fchg and voltage change amount Vchg are classified into the same phase or the opposite phase, and generates a control signal Ssgn similar to that of the second embodiment based on the determination result.

The functions of control characteristic setting unit 250, control map 260, and instruction value generation unit 270 are similar to those in the second embodiment. That is, control characteristic setting unit 250 sets gain Kc or reactive power instruction value Qref similarly to the second embodiment using the reference value of control map 260 with respect to frequency change amount fchg and control signal Ssgn. Accordingly, in the case of Ssgn=1, gain Kc or reactive power instruction value Qref is set according to the reference value of control map 260. Accordingly, the control characteristic is set such that the lead reactive power is injected for fchg>0 while the delay reactive power is injected for fchg<0.

On the other hand, in the case of Ssgn=0, the reference value of control map 260 is multiplied by −1, namely, the polarity (sign) is inverted, and gain Kc or reactive power instruction value Qref is set. Accordingly, the control characteristic is set such that the delay reactive power is injected for fchg>0 while the lead reactive power is injected for fchg<0.

As described above, in the third embodiment, the selection (that is, the value of control signal Ssgn is set) of the control characteristic described in the second embodiment is controlled according to the phase relationship between periodically changing frequency change amount fchg and voltage change amount Vchg in AC power line 20 into which reactive power Qc is injected by power converter 110.

Figure 21A:
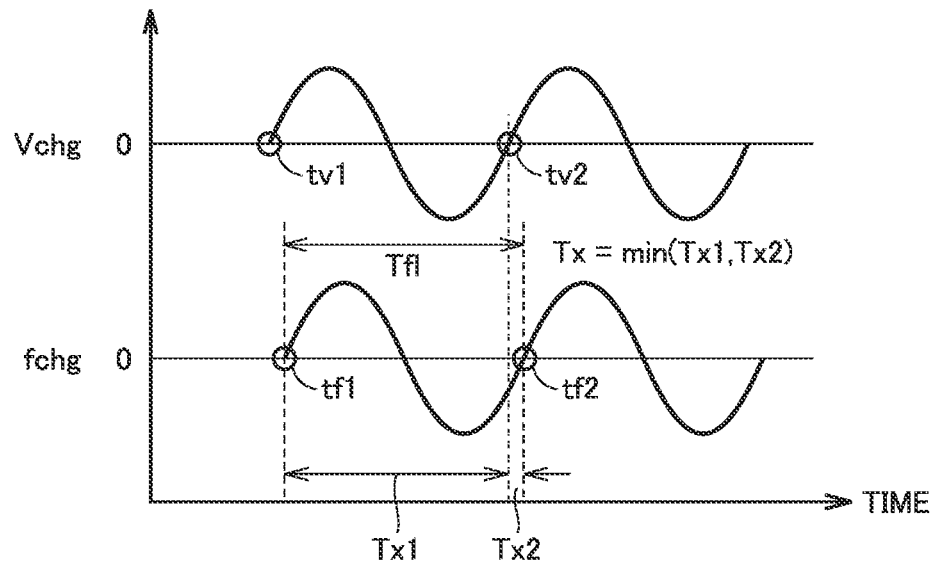
FIG. 21A is a first waveform diagram illustrating a first example of flicker phase difference detection processing.
Figure 21B:
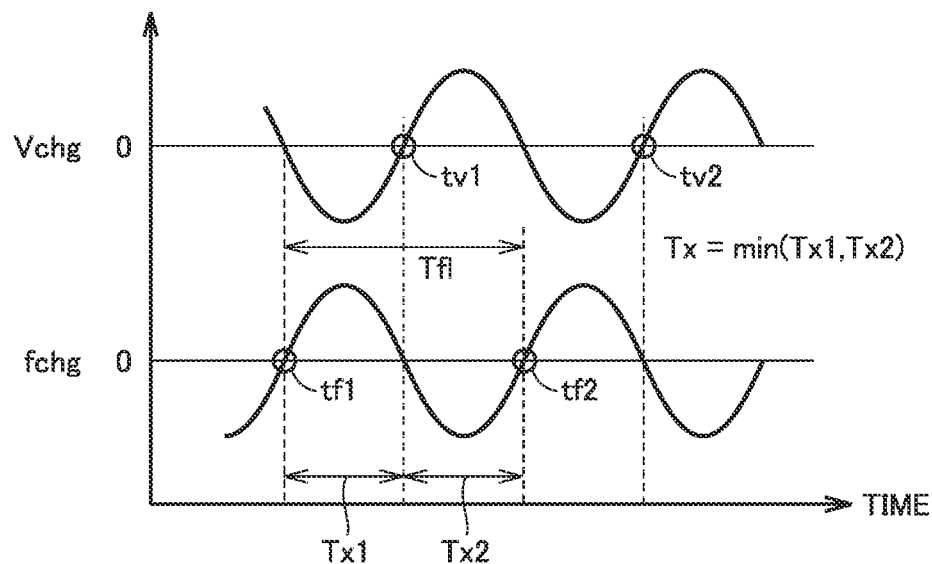
FIG. 21B is a second waveform diagram illustrating the first example of the flicker phase difference detection processing.

Here, a first example of the flicker phase difference detection processing will be described with reference to FIGS. 21A to 21C. FIG. 21A illustrates a waveform example when frequency change amount fchg and voltage change amount Vchg are in the same phase, and FIG. 21B illustrates a waveform example when frequency change amount fchg and voltage change amount Vchg are in completely opposite phases (that is, the phase difference is 180 degrees).

In the first example, whether frequency change amount fchg and voltage change amount Vchg are in the same phase or in the opposite phase is detected based on the time difference between the zero cross timing of frequency change amount fchg and the zero cross timing of voltage change amount Vchg. FIGS. 21A and 21B illustrate zero-cross timings tf1, tf2 of frequency change amount fchg and zero-cross timings tv1, tv2 of voltage change amount Vchg. The time difference between zero-cross timings tf1, tf2 and the time difference between zero-cross timings tv1, tv2 correspond to flicker period Tfl.

On the other hand, the time difference between zero cross timing tf1 of frequency change amount fchg and zero cross timing tv1 of voltage change amount Vchg and the time difference between zero cross timing tf2 of frequency change amount fchg and zero cross timing tv2 of voltage change amount Vchg correspond to the phase difference between frequency change amount fchg and voltage change amount Vchg.

Here, using zero cross timing tv2 of voltage change amount Vchg generated between two zero cross timings tf1 and tf2 of frequency change amount fchg, the minimum value of time difference Tx1 of zero cross timings tf1 and tv2 and time difference Tx2 of zero cross timings tf2 and tv2 can be set as phase difference Tx (Tx=min (Tx1, Tx2)). In this manner, flicker phase difference detection unit 230 can sequentially calculate phase difference Tx according to the detection of the zero cross timing of frequency change amount fchg and the zero cross timing of voltage change amount Vchg.

Flicker phase difference determination unit 240 can classify whether frequency change amount fchg and voltage change amount Vchg are in the same phase or in the opposite phase by comparing phase difference Tx with a determination value set according to flicker period Tfl.

Figure 21C:
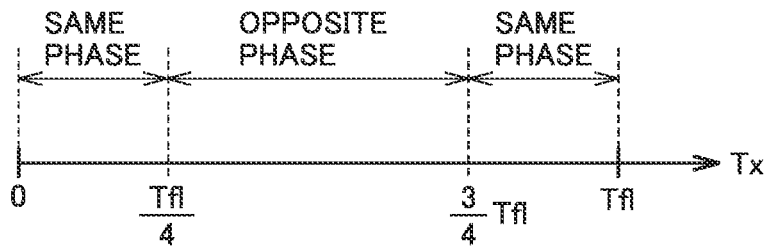
FIG. 21C is a conceptual diagram illustrating the first example of the flicker phase difference detection processing.

For example, as illustrated in FIG. 21C, in the case of Tfl/4<Tx<Tfl·(¾), it can be determined that frequency change amount fchg and voltage change amount Vchg are in opposite phases, and in the case of 0≤Tx≤Tfl/4 or Tfl·(¾)≤Tx<Tfl, it can be determined that frequency change amount fchg and voltage change amount Vchg are in the same phase.

That is, the fact that frequency change amount fchg and voltage change amount Vchg have opposite phases means that the phase difference between frequency change amount fchg and voltage change amount Vchg with flicker period Tfl set to 360 degrees is closer to 180 degrees than 0 degrees. On the contrary, the fact that frequency change amount fchg and voltage change amount Vchg are in the same phase means that the phase difference between frequency change amount fchg and voltage change amount Vchg is closer to 0 degrees than 180 degrees.

Figure 22A:
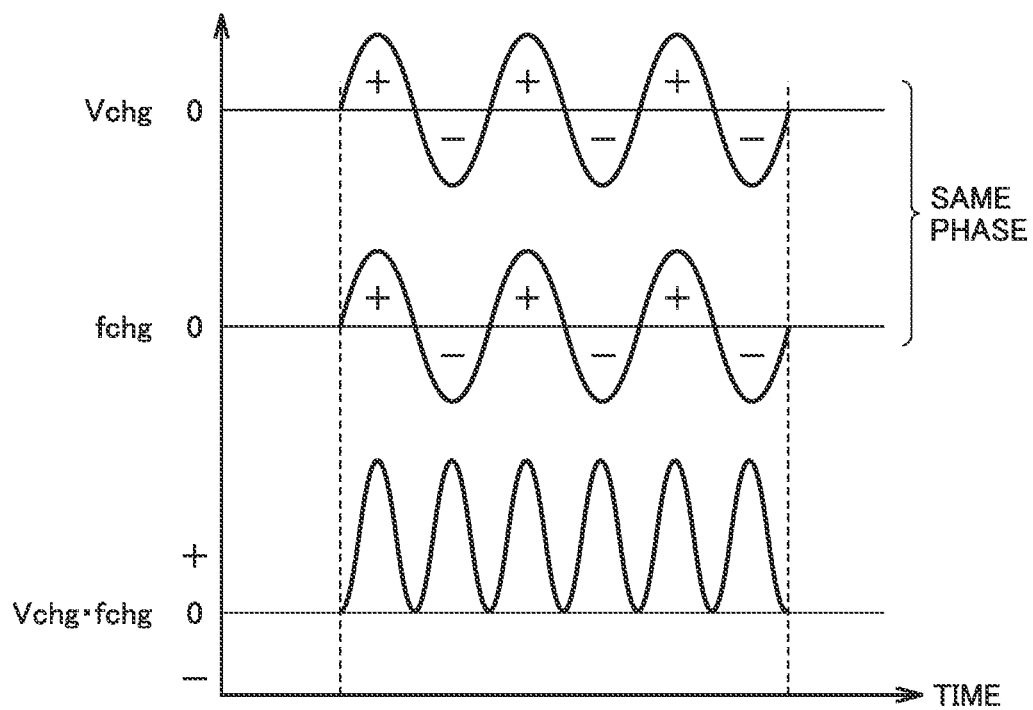
FIG. 22A is a first waveform diagram illustrating a second example of the flicker phase difference detection processing.
Figure 22B:
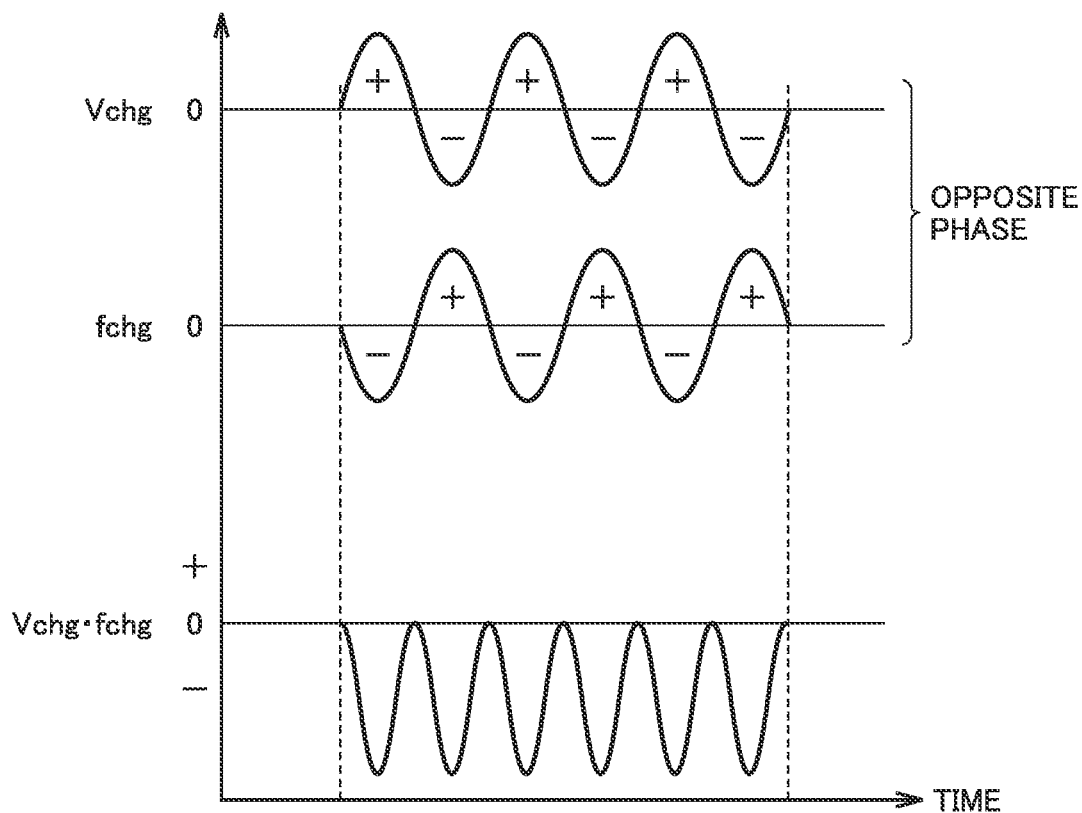
FIG. 22B is a second waveform diagram illustrating a second example of the flicker phase difference detection processing.

With reference to FIGS. 22A and 22B, a second example of the flicker phase difference detection processing will be described below. FIG. 22A illustrates a waveform example when frequency change amount fchg and voltage change amount Vchg are in the same phase, and FIG. 22B illustrates a waveform example when frequency change amount fchg and voltage change amount Vchg are in completely opposite phases (that is, the phase difference is 180 degrees).

In the second example, whether frequency change amount fchg and voltage change amount Vchg are in the same phase or in the opposite phase is determined based on the sign (polarity) of the product of frequency change amount fchg and voltage change amount Vchg.

As illustrated in FIG. 22A, when frequency change amount fchg and voltage change amount Vchg are in the same phase, the signs (polarities) of frequency change amount fchg and voltage change amount Vchg are the same, so that the polarity (sign) of Vchg·fchg obtained by multiplying frequency change amount fchg and voltage change amount Vchg together is positive (+).

On the other hand, as illustrated in FIG. 22B, when frequency change amount fchg and voltage change amount Vchg are in completely opposite phases (phase difference is 180 degrees), the signs (polarities) of frequency change amount fchg and voltage change amount Vchg are opposite, so that the polarity (sign) of Vchg·fchg obtained by multiplying by frequency change amount fchg and voltage change amount Vchg together is negative (−).

Accordingly, whether frequency change amount fchg and voltage change amount Vchg are classified into the same phase or the opposite phase can be determined based on the polarity (positive or negative) of a correlation coefficient VFr defined by the following equation (1). An integration period T in the equation (1) can be set to an integral multiple of flicker period Tfl.

[Mathematical formula 1]

$$VFr = \frac{\int_0^T V chg \cdot fchg \, dt}{\sqrt{\int_0^T Vchg^2 dt} \cdot \sqrt{\int_0^T fchg^2 dt}} \quad (1)$$

For example, flicker phase difference detection unit 230 can obtain correlation coefficient VFr for each flicker period Tfl by the operation of the equation (1) according to the input of frequency change amount fchg and voltage change amount Vchg.

When Vchg·fchg is positive, correlation coefficient VFr is positive, so that flicker phase difference determination unit 240 determines that frequency change amount fchg and voltage change amount Vchg are in the same phase. On the other hand, when Vchg·fchg is negative, correlation coefficient VFr is negative, flicker phase difference determination unit 240 determines that frequency change amount fchg and voltage change amount Vchg are in opposite phases.

Figure 23:
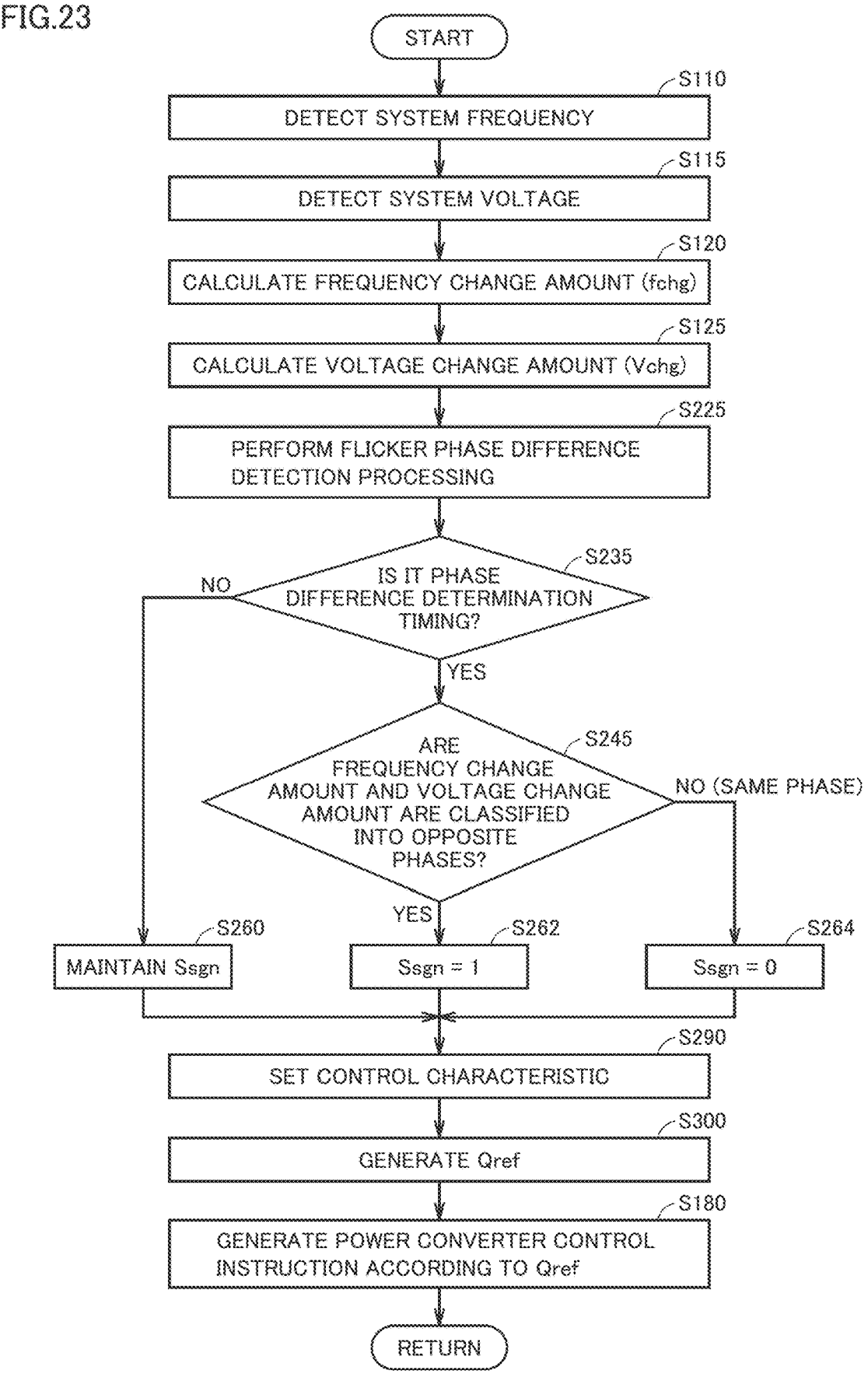
FIG. 23 is a flowchart illustrating setting of a flicker prevention control method of the third embodiment.

FIG. 23 is a flowchart illustrating setting of a flicker prevention control method of the third embodiment.

With reference to FIG. 23, controller 157 detects system frequency f and calculates frequency change amount fchg in S110 and S120 similar to those in FIG. 11 and the like. Furthermore, controller 157 detects system voltage effective value V in S115 and calculates voltage change amount Vchg in S125.

In step S225, controller 157 executes phase difference detection processing of frequency change amount fchg and voltage change amount Vchg. In S225, the zero cross timing detection processing in FIGS. 21A and 21B or the operation processing of correlation coefficient VFr according to equation (1) is executed. The function of flicker phase difference detection unit 230 (FIG. 20) is implemented by the processing in S225.

In step S235, controller 157 determines whether it is the phase difference determination timing. In the example of FIGS. 21A to 21C, the affirmative determination is made in S235 at the zero cross timing of frequency change amount fchg. In the example of FIGS. 22A and 22B, the affirmative determination is made in step S 35 every time integration period T in the equation (1) elapses.

At the phase difference determination timing (YES in S235), controller 157 determines whether frequency change amount fchg and voltage change amount Vchg are in the opposite phases in S245. For example, when phase differences Tx in FIGS. 21A to 21C are continuously determined to be the same phase over the plurality of predetermined flicker periods, the negative determination is made in S245. Alternatively, when correlation coefficient VFr>0 calculated according to the equation (1) continues over the plurality of predetermined flicker periods, the negative determination is made in S245. Otherwise, the affirmative determination is made in S245 (reverse phase).

In the power system, when the flicker caused by the reactive power injection of PCS 30 controlled by the characteristic in FIG. 5 is generated, normally, voltage change amount Vchg and frequency change amount fchg have opposite phases as described in FIG. 5. Accordingly, when the affirmative determination is made in S245, controller 157 sets Ssgn=1 in S262. Thus, in control characteristic setting unit 250, the control characteristic is set such that the lead reactive power is injected for frequency change amount fchg>0 while the delay reactive power is injected for fchg<0.

On the other hand, when the negative determination is made in S245, namely, when frequency change amount fchg and voltage change amount Vchg are in the same phase, controller 157 sets Ssgn=0 in S262. Thus, contrary to the case of the opposite phase, control characteristic setting unit 250 sets the control characteristic such that the delay reactive power is injected for frequency change amount fchg>0 while the lead reactive power is injected for fchg<0.

As described above, when the impedance of AC power line 20 is large between power converter 110 and PCS 30 that generates the flicker, sometimes frequency change amount fchg detected by power converter 110 and frequency change amount detected by PCS 30 are not matched with each other due to the action of the voltage drop caused by the impedance, and have opposite phases. In this case, voltage change amount Vchg and frequency change amount detected by PCS 30 have opposite phases as illustrated in FIG. 5, but voltage change amount Vchg and frequency change amount fchg detected by power converter 110 have the same phase.

Controller 157 maintains control signal Ssgn at the current value in S260 in order to maintain the result of the previous phase difference determination at timing other than the phase difference determination timing (NO in S235). As described above, the function of flicker phase difference determination unit 240 (FIG. 20) is implemented by the pieces of processing in S235 to S264.

When setting control signal Ssgn in any one of S260 to S264, controller 157 advances the processing to S290 similar to FIG. 17, and further advances the processing to S300 and S180 similar to FIG. 11 and the like.

As described above, according to the flicker prevention device and the flicker prevention control method of the third embodiment, similarly to the second embodiment, the control characteristic of the reactive power, namely, the polarity (advance or delay of reactive power Qc) of reactive power instruction value Qref with respect to the polarity (positive or negative) of frequency change amount fchg can be selected according to the flicker behavior. That is, also in the third embodiment, the polarity of the reactive power injected from power converter 110 can be appropriately selected so as to decrease the amount of change in the system frequency detected by PCS 30 in consideration of the action of the voltage drop caused by the impedance between the interconnection point of power converter 110 and the interconnection point of PCS 30 on AC power line 20. Thus, the flicker caused by PCS 30 can be stably prevented at high speed even when the situation of the power system changes.

Also in the third embodiment, in the configuration of FIG. 20, switching relaxation processing unit 255 described in the modification of the second embodiment can be disposed between control characteristic setting unit 250 and instruction value generation unit 270 or at a subsequent stage of instruction value generation unit 270. In this way, the influence on the system can be prevented when the value of the control signal Ssgn is changed, namely, when the control characteristic of the flicker prevention control is switched.

Modification of Third Embodiment

In the third embodiment, unlike the second embodiment, the phase difference between voltage change amount Vchg and frequency change amount fchg is detected as the flicker behavior and control signal Ssgn is set, so that the appropriate control characteristic can be previously selected in a non-output period of reactive power Qc from power converter 110.

Figure 24:
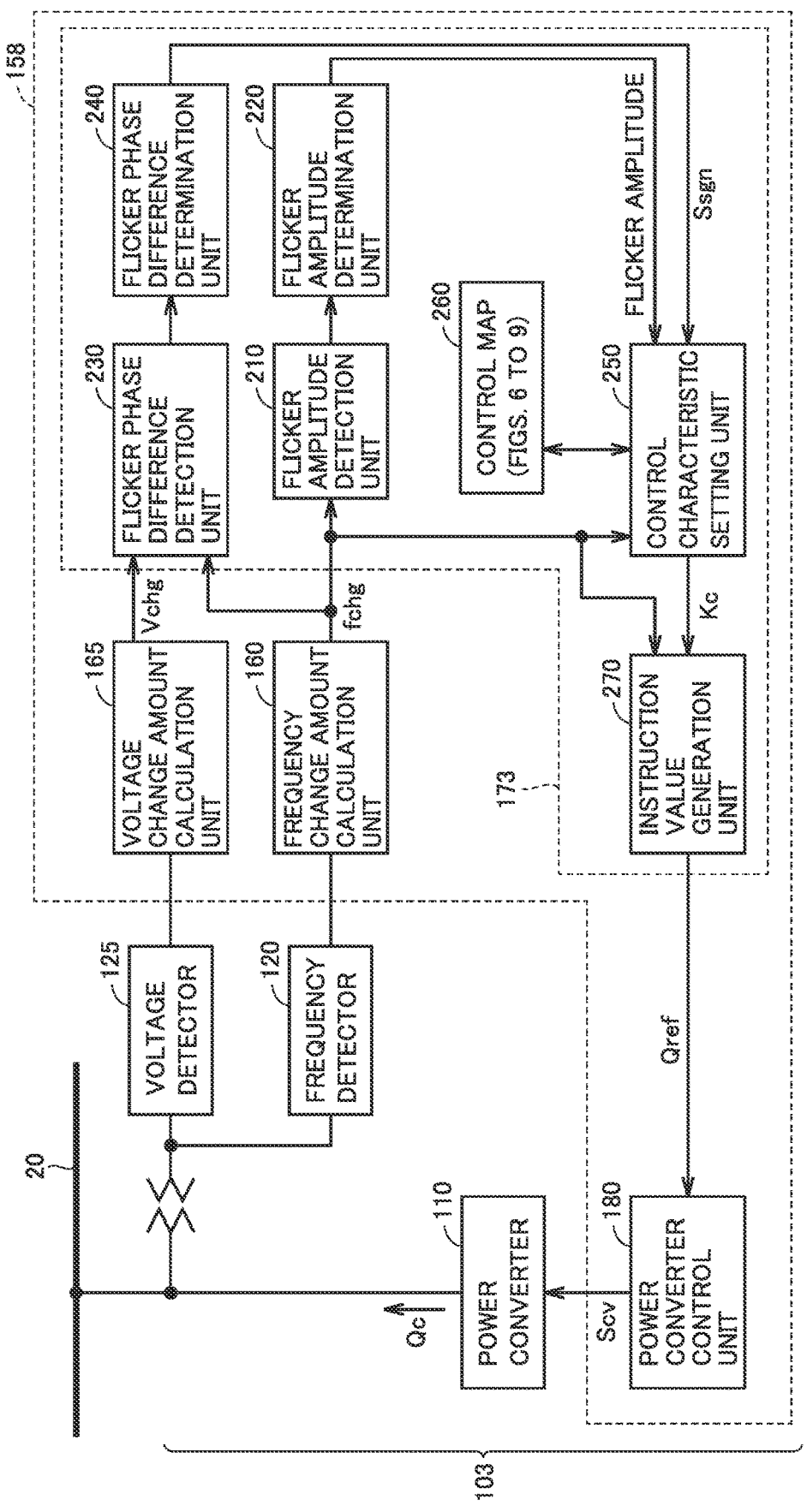
FIG. 24 is a schematic block diagram illustrating a configuration of a flicker prevention device according to a modification of the third embodiment.

FIG. 24 is a schematic block diagram illustrating a configuration of a flicker prevention device 103 according to a modification of the third embodiment.

As illustrated in FIG. 24, flicker prevention device 103 of the modification of the third embodiment is different from flicker prevention device 102 in FIG. 20 in that a controller 158 is included instead of controller 157. Controller 158 is different from controller 157 in FIG. 20 in that a control arithmetic unit 173 is included instead of control arithmetic unit 172.

Control arithmetic unit 173 further includes flicker amplitude detection unit 210 and flicker amplitude determination unit 220 similar to those in FIG. 14 in addition to the configuration of control arithmetic unit 172 (FIG. 20). In control arithmetic unit 173, control signal Ssgn is set by flicker phase difference determination unit 240 similarly to the third embodiment.

The flicker amplitude value and the determination result at the determination timing of the flicker amplitude acquired by flicker amplitude detection unit 210 and flicker amplitude determination unit 220 in the same manner as the second embodiment are input to control characteristic setting unit 250. In the modification of the third embodiment, control characteristic setting unit 250 determines the start and end of the reactive power output based on the flicker amplitude of frequency change amount fchg.

Figure 25:
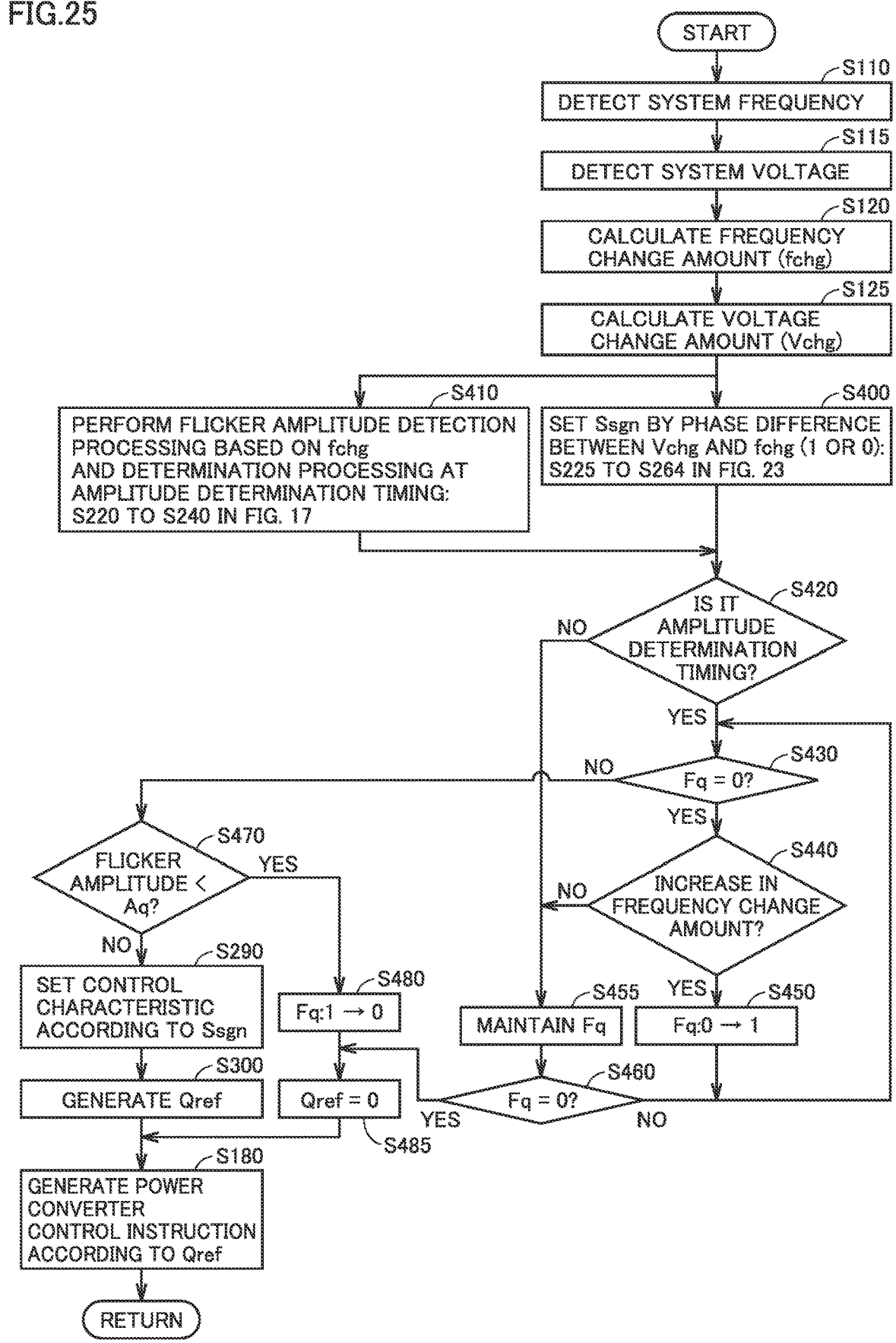
FIG. 25 is a flowchart illustrating setting of a flicker prevention control method according to a modification of the third embodiment.

FIG. 25 is a flowchart illustrating setting of a flicker prevention control method of the modification of the third embodiment.

With reference to FIG. 25, controller 158 calculates frequency change amount fchg and voltage change amount Vchg in the pieces of processing in S110 to S125 similar to FIG. 23. Furthermore, similarly to the third embodiment, in step S400, controller 158 sets control signal Ssgn to 0 or 1 based on the phase difference between frequency change amount fchg and voltage change amount Vchg by the pieces of processing in steps S225 to S264 in FIG. 23. The processing of S400 corresponds to the functions of flicker phase difference detection unit 230 and flicker phase difference determination unit 240.

Similarly to the second embodiment, in S410, controller 158 executes the flicker amplitude value detection processing (S220) and the determination of the presence or absence of the generation of the amplitude increase at the amplitude determination timing (S230, S240) based on frequency change amount fchg in the pieces of processing in S220 to S240 of FIG. 17. The processing in S410 corresponds to the functions of flicker amplitude detection unit 210 and flicker amplitude determination unit 220.

Using control signal Ssgn set in S400 and the flicker amplitude value and the amplitude determination result obtained in S410, controller 158 executes the processing in and after S420. A control flag Fq indicating whether reactive power Qc is currently output from power converter 110 in order to perform the flicker prevention control is set in the third embodiment. Control flag Fq is set to Fq=1 in the output period of reactive power Qc, and is set to Fq=0 in the non-output period of reactive power Qc.

In step S420, controller 158 starts the determination of the start or end of the reactive power output at the amplitude determination timing at which the flicker amplitude value is updated in step S410. At the timing other than the determination timing of the flicker amplitude (NO in S420), the current value of control flag Fq is maintained in S455.

At the amplitude determination timing (YES in S420), the processing branches according to the value of control flag Fq in S430. In the case of Fq=0 (YES in S430), the processing proceeds to S440, and whether to start the output of reactive power Qc is determined. Specifically, in S440, controller 158 can determine whether the frequency change amount (flicker) increases by the same determination as that in S240 of FIG. 17. When it is determined that the flicker amplitude increases (YES in S440), controller 158 changes control flag Fq from 0 to 1 in order to start the output of reactive power Qc in S450.

Alternatively, in S440, the determination in which the flicker amplitude updated at the amplitude determination timing is simply compared with a predetermined determination value Ath may be performed. In this case, when the parameter value (absolute value) indicating the flicker amplitude is larger than determination value Ath, the affirmative determination is made in S440, and otherwise, the negative determination is made in S440.

When control flag Fq changes from 0 to 1 (S450) and when control flag Fq maintained in S455 is 1 (NO in S460), the processing proceeds to S430.

In S430, in the case of control flag Fq=1, the processing proceeds to S470 in order to determine the end of the reactive power output. In S470, controller 158 determines whether the flicker amplitude is decreased to less than a determination value Aε by the output of reactive power Qc. Determination value Aε is set corresponding to the flicker amplitude in the vicinity of time t2 in FIG. 12.

When the flicker amplitude is less than determination value Aε (YES in S470), controller 158 changes control flag Fq from 1 to 0 in 5480 and sets reactive power instruction value Qref to 0 in S485 in order to end the output of the reactive power. When control flag Fq maintained in S455 is 0 (YES in S460), namely, even when the output stop of the reactive power is maintained, the processing proceeds to S485 and Qref is set to 0.

When control flag Fq is set to 1 in S450, namely, when it is determined to start the output of reactive power Qc, the affirmative determination is naturally made in S470, and the processing proceeds to S290. Also during the output of reactive power Qc, when the flicker amplitude is greater than or equal to determination value Aε, the affirmative determination is made in S470, and the processing proceeds to S290.

Controller 158 sets the control characteristic in S290 according to control signal Ssgn set in S400, and sets reactive power instruction value Qref in S300 according to the control characteristic set in S290. That is, when the output of the reactive power is started, reactive power instruction value Qref is set in the same manner as in FIG. 23.

In S180, controller 158 generates control instruction Scv of power converter 110 according to reactive power instruction value Qref set in S300 or S485. When power converter 110 operates in accordance with control instruction Scv generated in S180, reactive power Qc according to reactive power instruction value Qref set similarly to the third embodiment is injected into AC power line 20 during the period of control flag Fq=1. On the other hand, during the period of the control flag Fq=0 in which Qref=0 is set, the output of the reactive power from power converter 110 to AC power line 20 is stopped.

According to the control processing in FIG. 25, in the period of Fq=0, the value of control signal Ssgn can be determined to set the appropriate control characteristic based on the phase difference between voltage change amount Vchg and frequency change amount fchg in S400. Thus, the appropriate control characteristic can be set from the start of the output of the reactive power.

Figure 26:
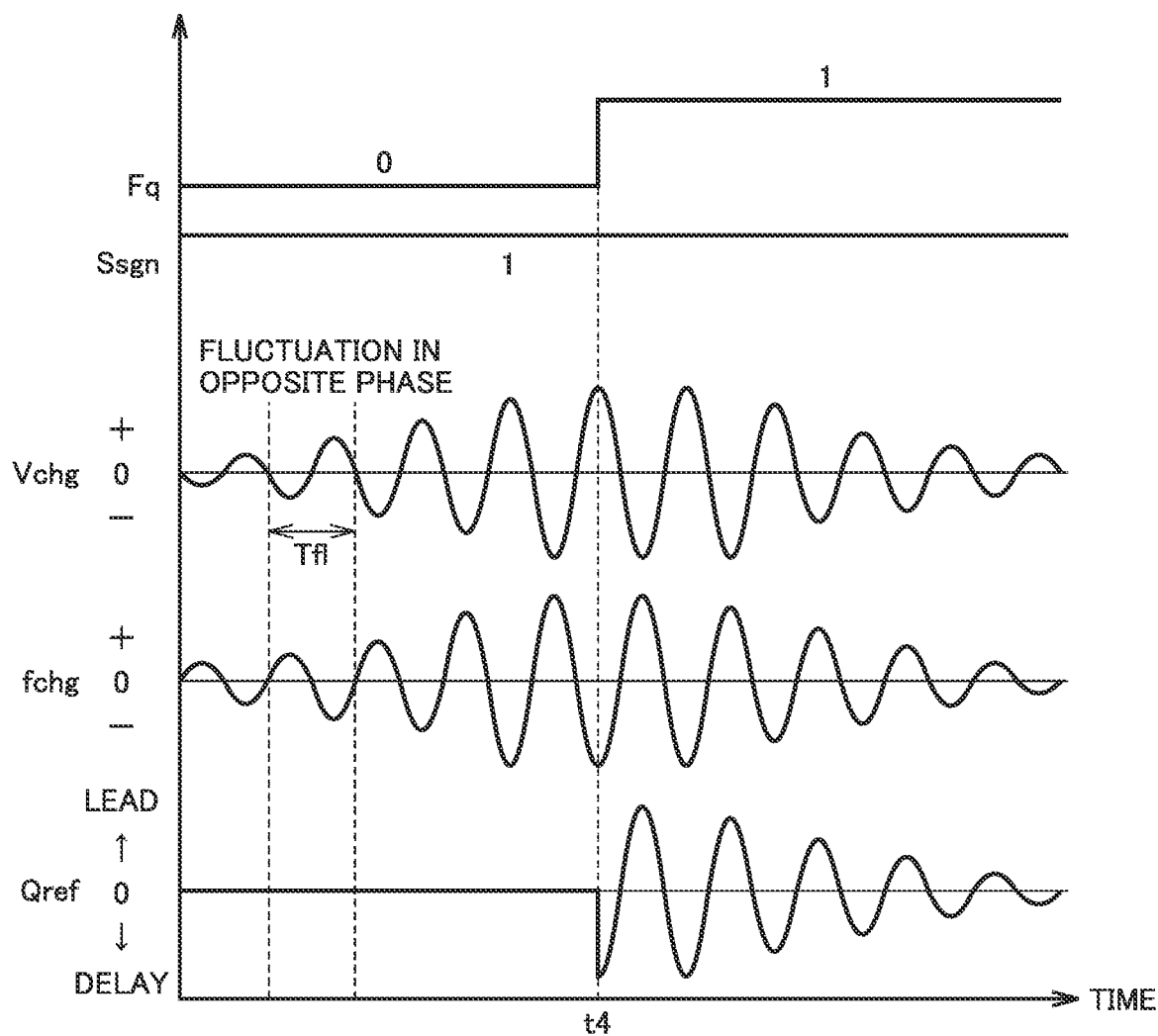
FIG. 26 is a first waveform diagram illustrating an operation example of the flicker prevention control according to the modification of the third embodiment.
Figure 27:
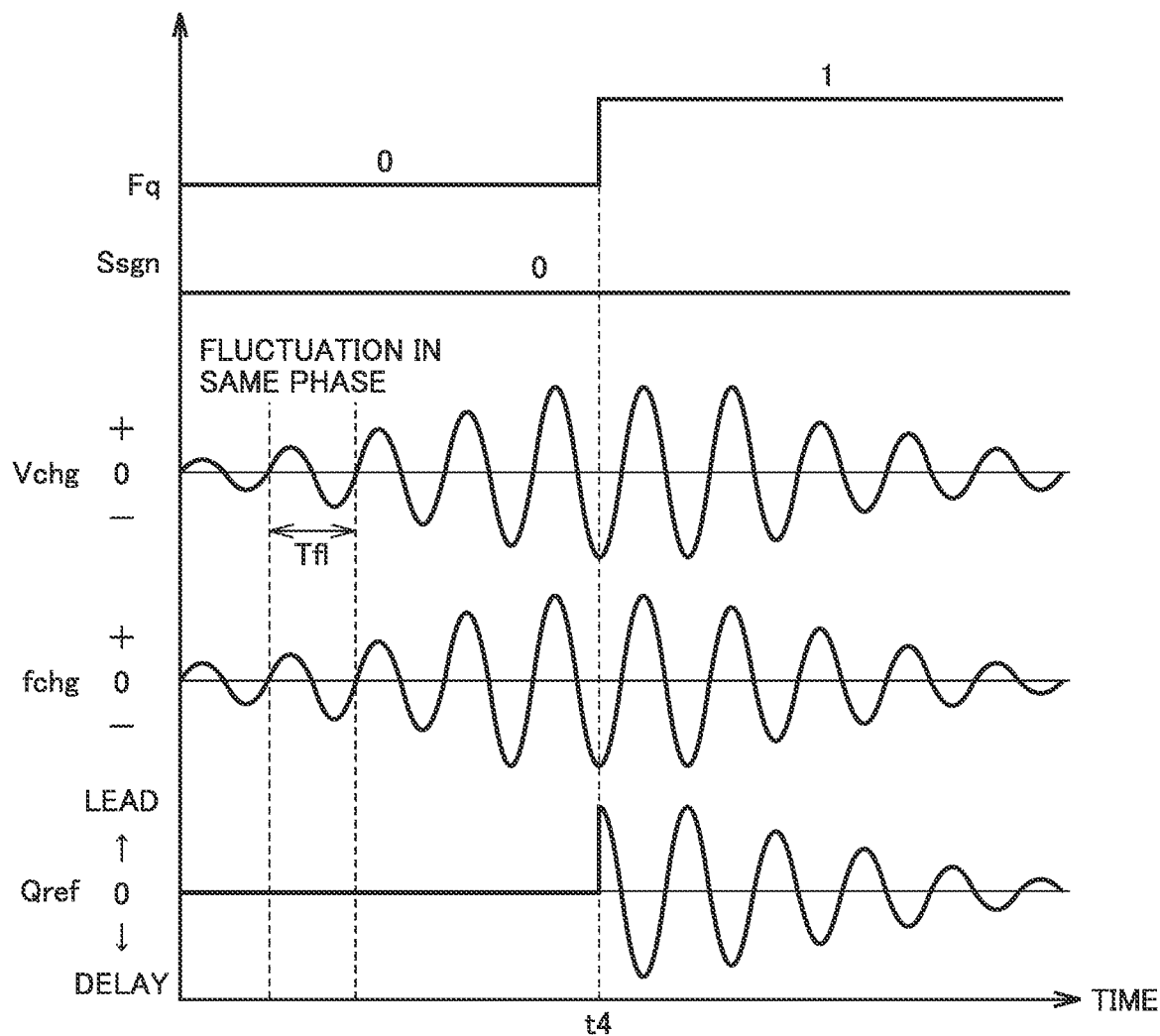
FIG. 27 is a second waveform diagram illustrating an operation example of the flicker prevention control according to the modification of the third embodiment.

FIGS. 26 and 27 are first waveform diagrams illustrating an operation example of the flicker prevention control of the third embodiment. In FIGS. 26 and 27, before a time t4, control flag Fq is set to 0, and reactive power Qc is not injected into AC power line 20.

In the example of FIG. 26, before time t4, the flicker amplitude increases under the condition that voltage change amount Vchg and frequency change amount fchg have opposite phases. Accordingly, in the period before time t4 in the case of Fq=0, control signal Ssgn=1 is set.

At time t4, the affirmative determination is made in step S440 in FIG. 25 according to the increase in the flicker amplitude, so that control flag Fq is set to 1 to start the output of reactive power Qc. In FIG. 26, control signal Ssgn=1 is set at time t4, so that reactive power instruction value Qref is set with control characteristics similar to those in FIG. 12. That is, power converter 110 is controlled such that the lead reactive power is injected for frequency change amount fchg>0 while the delay reactive power is injected for fchg<0, whereby the flicker amplitude is decreased after time t4.

In the example of FIG. 27, contrary to FIG. 26, before time t4, the flicker amplitude increases under the condition that voltage change amount Vchg and frequency change amount fchg are in the same phase. Accordingly, in the period before time t4 in the case of Fq=0, control signal Ssgn=0 is set.

Also in FIG. 27, at time t4, the affirmative determination is made in S440 of FIG. according to the increase in the flicker amplitude, so that control flag Fq is set to 1 to start the output of the reactive power. In FIG. 27, because of control signal Ssgn=0 at time t4, reactive power instruction value Qref is set with the same control characteristic as in FIG. 13. That is, power converter 110 is controlled such that the delay reactive power is injected for frequency change amount fchg>0 while the lead reactive power is injected for fchg<0.

Even after time t4, when the state in which voltage change amount Vchg and frequency change amount fchg are in the same phase is maintained, Ssgn=0 is maintained, and reactive power Qc output from power converter 110 is controlled. As a result, the flicker amplitude is gradually decreased after time t4.

After time t4 at which the injection of the reactive power is started, the control characteristic may be switched according to the second embodiment. For example, when the flicker amplitude increases after injection of reactive power is started from time t4 according to the control characteristic selected based on the phase difference between voltage change amount Vchg and frequency change amount fchg before time t4, the control characteristic can be switched to control reactive power Qc output from power converter 110. In addition, even in the case where the control characteristic is switched after time t4 in the modification of the third embodiment, switching relaxation processing unit 255 described in the modification of the second embodiment can be operated.

As described above, according to the flicker prevention control of the modification of the third embodiment, based on the phase difference between voltage change amount Vchg and frequency change amount fchg in the non-output period (that is, before output) of the reactive power, the appropriate control characteristic, namely, the polarity (lead or delay of reactive power Qc) of reactive power instruction value Qref with respect to the polarity (positive or negative) of the frequency change amount can be set so as to decrease the change amount of the system frequency detected by PCS 30 from the time of starting the output of the reactive power. As a result, the temporary flicker increase phenomenon due to the injection of the reactive power such as time t1 to t3 in FIG. 13 can be avoided.

It should be considered that the disclosed embodiments are an example in all respects and not restrictive. The technical scope of the present invention is defined by not the description above, but the claims, and it is intended that all modifications within the meaning and scope of the claims are included in the present invention.

REFERENCE SIGNS LIST

10: voltage source, 20: AC power line, 30: power conditioner (PCS), 40: distributed power supply, 100 to 103: flicker prevention device, 110: power converter, 120: frequency detector, 125: voltage detector, 150, 156 to 158: controller, 155: bus, 160: frequency change amount calculation unit, 161: current moving average value calculation unit, 162: past moving average value calculation unit, 165: voltage change amount calculation unit, 163: subtraction unit, 170: control arithmetic unit, 180: power converter control unit, 210: flicker amplitude detection unit, 220: flicker amplitude determination unit, 230: flicker phase difference detection unit, 240: flicker phase difference determination unit, 250: control characteristic setting unit, 255: switching relaxation processing unit, 256: change rate limiting unit, 260: control map, 270: instruction value generation unit, Amp, Amn: amplitude value (flicker), Kp: proportional gain, Qc, Qx: reactive power, Scv: control instruction (power converter), Sn, Sp: integral value (flicker), Ssgn: control signal (control characteristic selection), Tfl: flicker period, Qref: reactive power instruction value, q: control flag (during reactive power injection), V: system voltage effective value, f: system frequency, fav1, fav2: moving average value, fchg: frequency change amount, tf1, tf2, tv1, tv2, tzc: zero crossing timing

The invention claimed is:

1. A flicker prevention device for a power system to which a power conditioner performing system interconnection of a distributed power supply is connected, the flicker prevention device comprising:
   a power converter to inject delay reactive power or lead reactive power into the power system;
   a frequency detector to detect a system frequency of an AC voltage on the power system;
   a frequency change amount calculator to calculate a change amount of the detected system frequency; and
   a controller configured to control, when a first control characteristic is selected, the power converter to output the lead reactive power in response to an increase in the system frequency and to output the delay reactive power in response to an decrease in the system frequency, and, when a second control characteristic is selected, to control the power converter to output the delay reactive power in response to the increase in the system frequency and to output the lead reactive power in response to the decrease in the system frequency, wherein the controller, when increase of the change amount of the system frequency is detected while controlling the power converter according to selected one of the first control characteristic and the second control characteristic, switches the selected one of the first control characteristic and the second control characteristic to the other control characteristic.

2. The flicker prevention device according to claim 1, further comprising:
a voltage detector to detect a system voltage effective value of an AC voltage on the power system; and
a voltage change amount calculator to calculate a change amount of the system voltage effective value,
wherein the controller selects one of the first control characteristic and the second control characteristic according to a phase relationship between a temporal change according to a flicker period in the change amount of the system voltage effective value and a temporal change according to the flicker period in the change amount of the system frequency.

3. The flicker prevention device according to claim 1, further comprising:
a voltage detector to detect a system voltage effective value of an AC voltage on the power system; and
a voltage change amount calculator to calculate a change amount of the system voltage effective value,
wherein the controller selects one control characteristic from the first control characteristic and the second control characteristic according to a phase relationship between a temporal change according to a flicker period in the change amount of the system voltage effective value and a temporal change according to the flicker period in the change amount of the system frequency in a non-output period of the reactive power by the power converter, and controls the reactive power output from the power converter according to the one control characteristic when the output of the reactive power is started from the power converter.

4. The flicker prevention device according to claim 2, wherein the controller selects the first control characteristic when a phase difference between a temporal change in the change amount of the system voltage effective value and a temporal change in the change amount of the system frequency with the flicker period set to 360 degrees is closer to 180 degrees than 0 degrees, and selects the second control characteristic when the phase difference is closer to 0 degrees than 180 degrees.

5. The flicker prevention device according to claim 1, wherein the controller reduces a ratio of magnitude of the reactive power to the change amount of the system frequency during a given period set when switching between the first control characteristic and the second control characteristic so as to avoid sudden change of the reactive power output from the power converter.

6. The flicker prevention device according to claim 1, wherein
the controller includes:
a control arithmetic unit that calculates a reactive power instruction value according to a predetermined control operation with the change amount calculated by the frequency change amount calculator as input; and a power converter controller that generates a control instruction for the power converter to output the reactive power according to the reactive power instruction value,
the control operation is performed such that the reactive power instruction value is set such that magnitude of the reactive power and an absolute value of the change amount are proportional to each other according to a product of a proportional gain and the change amount, and
a polarity of the proportional gain is different between the first control characteristic and the second control characteristic.

7. The flicker prevention device according to claim 6, wherein an absolute value of the proportional gain is set to a smaller value in a region where an absolute value of the change amount is smaller than a determination value as compared with a region where an absolute value of the change amount is larger than the determination value.

8. The flicker prevention device according to claim 7, wherein the proportional gain is set to zero in a region where an absolute value of the change amount is smaller than the determination value.

9. The flicker prevention device according to claim 1, wherein the frequency change amount calculator calculates the change amount according to a difference between a moving average value of the system frequency in a first period before a current point of time and a moving average value of the system frequency in a second period before the first period.

10. The flicker prevention device according to claim 1, wherein the frequency change amount calculator calculates the change amount according to a difference between a reference value of the system frequency and a moving average value of the system frequency in a first period before a current point of time.

11. A flicker prevention control method for a power system to which a power conditioner performing system interconnection of a distributed power supply is connected, the flicker prevention control method comprising:
detecting a system frequency that is a frequency of an AC voltage on the power system;
calculating a change amount of the detected system frequency; and
controlling, when a first control characteristic is selected, the power converter to output a lead reactive power in response to an increase in the system frequency and to output a delay reactive power in response to an decrease in the system frequency, and controlling, when a second control characteristic is selected, the power converter to output the delay reactive power in response to the increase in the system frequency and to output the lead reactive power in response to the decrease in the system frequency,
wherein when increase of the change amount of the system frequency is detected while controlling the power converter according to selected one of the first control characteristic and the second control characteristic, the selected one of the first control characteristic and the second control characteristic is switched to the other control characteristic.

12. The flicker prevention control method according to claim 11, wherein
the controlling includes:
generating a reactive power instruction value by a control operation according to a selected one control characteristic of the first and second control characteristics with the calculated change amount as input; and generating a control instruction for the power converter to output reactive power according to the reactive power instruction value, and the reactive power instruction value is generated such that while the first control characteristic is selected, the power converter outputs the lead reactive power to compensate for the change amount when the change amount has a polarity indicating an increase in the system frequency, and the power converter outputs the delay reactive power to compensate for the change amount when the change amount has a polarity indicating a decrease in the system frequency, and while the second control characteristic is selected, the power converter outputs the delay reactive power to compensate for the change amount when the change amount has the polarity indicating the increase in the system frequency, and the power converter outputs the lead reactive power to compensate for the change amount when the change amount has the polarity indicating the decrease in the system frequency.

\* \* \* \* \*